US012505607B2

(12) United States Patent
McAllister et al.

(10) Patent No.: US 12,505,607 B2
(45) Date of Patent: Dec. 23, 2025

(54) GENERATION OF TIGHT WORLD SPACE BOUNDING REGIONS

(71) Applicant: QUALCOMM Incorporated, San Diego, CA (US)

(72) Inventors: David Kirk McAllister, Holladay, UT (US); Francois Mathias Robert Demoullin, San Diego, CA (US); Alexei Vladimirovich Bourd, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 127 days.

(21) Appl. No.: 18/500,016

(22) Filed: Nov. 1, 2023

(65) Prior Publication Data
US 2024/0062453 A1    Feb. 22, 2024

Related U.S. Application Data

(63) Continuation of application No. 17/665,327, filed on Feb. 4, 2022, now Pat. No. 11,861,785.

(51) Int. Cl.
*G06T 15/06* (2011.01)
*G06T 17/00* (2006.01)
*G06T 17/10* (2006.01)

(52) U.S. Cl.
CPC ............ *G06T 15/06* (2013.01); *G06T 17/005* (2013.01); *G06T 17/10* (2013.01)

(58) Field of Classification Search
None
See application file for complete search history.

(56) References Cited

U.S. PATENT DOCUMENTS

| 7,965,289 B1 * | 6/2011 | Green | G06T 15/005 345/419 |
| 8,253,730 B1 * | 8/2012 | Carr | G06T 17/005 345/419 |

(Continued)

FOREIGN PATENT DOCUMENTS

| CN | 102426710 A | 4/2012 |
| CN | 109255829 A | 1/2019 |

(Continued)

OTHER PUBLICATIONS

Bittner J., et al., "T-SAH: Animation Optimized Bounding Volume Hierarchies", Computer Graphics Forum : Journal of the European Association for Computer Graphics, Wiley-blackwell, Oxford, vol. 34, No. 2, Jun. 22, 2015, XP071544908, pp. 527-536, abstract.

(Continued)

*Primary Examiner* — Nurun Flora
(74) *Attorney, Agent, or Firm* — Polsinelli

(57) ABSTRACT

Systems and techniques are provided for determining bounding regions for a hierarchical structure for ray tracing. For instance, a process can include obtaining an acceleration data structure, the acceleration data structure including one or more primitives of a scene object. A graph cut can be applied to the acceleration data structure. A set of nodes of the acceleration data structure can be determined based on the graph cut, wherein the determined set of nodes is located adjacent to the graph cut. A world-space bounding box can be generated for the scene object, using the set of nodes determined based on the graph cut.

26 Claims, 12 Drawing Sheets

(56) References Cited

U.S. PATENT DOCUMENTS

| | | |
|---|---|---|
| 9,984,492 B2 | 5/2018 | Obert et al. |
| 2017/0116775 A1 | 4/2017 | Shin et al. |
| 2017/0287202 A1 | 10/2017 | Wald et al. |
| 2021/0390756 A1 | 12/2021 | Muthler et al. |
| 2022/0020200 A1 | 1/2022 | Fenney |
| 2022/0020201 A1* | 1/2022 | Fenney ................ G06T 15/506 |
| 2022/0051476 A1 | 2/2022 | Woop et al. |
| 2023/0252716 A1 | 8/2023 | McAllister et al. |

FOREIGN PATENT DOCUMENTS

| | | |
|---|---|---|
| CN | 113936091 A | 1/2022 |
| WO | 2016160334 A1 | 10/2016 |

OTHER PUBLICATIONS

International Search Report and Written Opinion—PCT/US2023/060774—ISA/EPO—May 15, 2023.

* cited by examiner

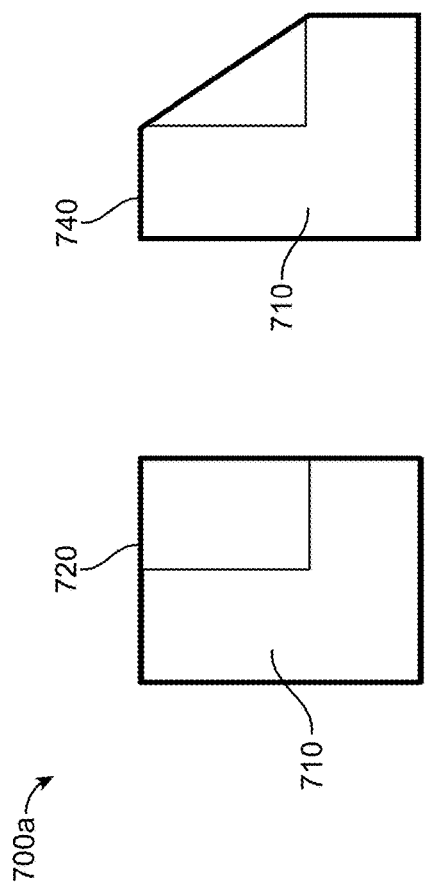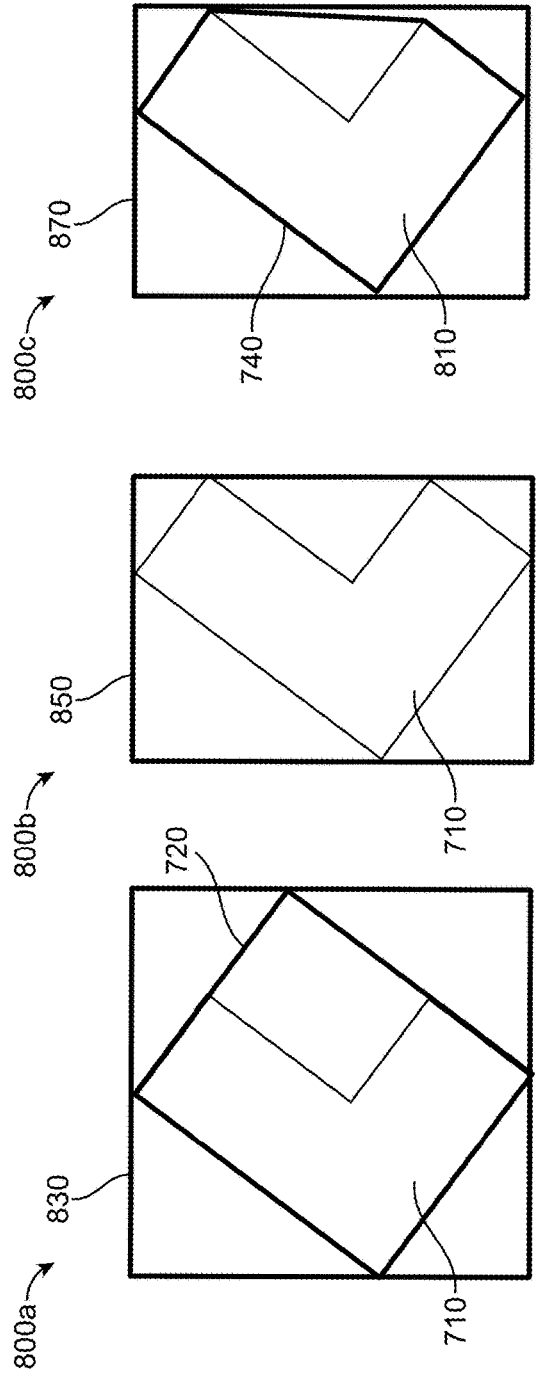

GENERATION OF TIGHT WORLD SPACE BOUNDING REGIONS

CROSS-REFERENCE TO RELATED APPLICATIONS

This application is a continuation of U.S. patent application Ser. No. 17/665,327, filed on Feb. 4, 2022, and entitled "GENERATION OF TIGHT WORLD SPACE BOUNDING REGIONS", the contents of which are incorporated herein in their entirety and for all purposes.

FIELD

The present disclosure generally relates to graphics processing. For example, aspects of the present disclosure are related to systems and techniques for determining bounding regions (e.g., bounding boxes or other regions) for a hierarchical structure for ray tracing.

BACKGROUND

Ray tracing is a computer graphics technique that can be used to generate images by tracing paths of light through a three-dimensional scene, simulating interactions with objects illuminated by light sources, and determining ray intersections. Ray intersections can include ray-primitive intersections or ray-object intersections. Primitives are geometric shapes that can be used to construct or model larger three-dimensional objects. For example, primitives can include triangles or polygons.

Ray tracing can be used to generate realistic images, including shadows, of a three-dimensional scene. Scene geometry can be stored in an acceleration data structure that groups scene primitives. An acceleration data structure can be used to accelerate the process of ray tracing by improving the efficiency of ray intersection tests and/or calculations. For example, a bounding volume hierarchy (BVH) is an acceleration data structure that can group scene primitives in a hierarchical tree of bounding volumes enclosing one or more of the scene primitives. Ray tracing can be performed by traversing these hierarchies to determine ray-primitive and/or ray-object intersections.

BRIEF SUMMARY

In some examples, systems and techniques are described for determining bounding regions (e.g., bounding boxes or other regions) for a hierarchical structure for ray tracing, such as for a ray tracing acceleration data structure. According to at least one illustrative example, a method is provided for ray tracing, the method including: obtaining an acceleration data structure, the acceleration data structure including one or more primitives of a scene object; applying a graph cut to the acceleration data structure; determining a set of nodes of the acceleration data structure based on the graph cut, wherein the set of nodes is located adjacent to the graph cut; and generating a world-space bounding box for the scene object, wherein the world-space bounding box is generated for the set of nodes determined based on the graph cut.

In another example, an apparatus for ray tracing is provided that includes a memory (e.g., configured to store data, such as virtual content data, one or more images, etc.) and one or more processors (e.g., implemented in circuitry) coupled to the memory. The one or more processors are configured to and can: obtain an acceleration data structure, the acceleration data structure including one or more primitives of a scene object; apply a graph cut to the acceleration data structure; determine a set of nodes of the acceleration data structure based on the graph cut, wherein the set of nodes is located adjacent to the graph cut; and generate a world-space bounding box for the scene object, wherein the world-space bounding box is generated for the set of nodes determined based on the graph cut.

In another example, a non-transitory computer-readable medium is provided that has stored thereon instructions that, when executed by one or more processors, cause the one or more processors to: obtain an acceleration data structure, the acceleration data structure including one or more primitives of a scene object; apply a graph cut to the acceleration data structure; determine a set of nodes of the acceleration data structure based on the graph cut, wherein the set of nodes is located adjacent to the graph cut; and generate a world-space bounding box for the scene object, wherein the world-space bounding box is generated for the set of nodes determined based on the graph cut.

In another example, an apparatus for ray tracing is provided. The apparatus includes: means for obtaining an acceleration data structure, the acceleration data structure including one or more primitives of a scene object; means for applying a graph cut to the acceleration data structure; means for determining a set of nodes of the acceleration data structure based on the graph cut, wherein the set of nodes is located adjacent to the graph cut; and means for generating a world-space bounding box for the scene object, wherein the world-space bounding box is generated for the set of nodes determined based on the graph cut.

According to another example, a method is provided for ray tracing. The method includes: obtaining a bottom-level acceleration structure (BLAS), the BLAS including one or more primitives of a scene object; calculating a proxy geometry for a plurality of vertices of the BLAS, the proxy geometry having a first number of vertices that is smaller than a number of vertices contained in the BLAS; transforming the first number of vertices of the proxy geometry into a plurality of proxy geometry world-space vertices; and generating a world-space axis-aligned bounding box (AABB) for the BLAS, wherein the world-space axis-aligned bounding box encloses the plurality of proxy geometry world-space vertices.

In another example, an apparatus for ray tracing is provided that includes a memory (e.g., configured to store data, such as virtual content data, one or more images, etc.) and one or more processors (e.g., implemented in circuitry) coupled to the memory. The one or more processors are configured to and can: obtain a bottom-level acceleration structure (BLAS), the BLAS including one or more primitives of a scene object; calculate a proxy geometry for a plurality of vertices of the BLAS, the proxy geometry have a first number of vertices that is smaller than a number of vertices contained in the BLAS; transform the first number of vertices of the proxy geometry into a plurality of proxy geometry world-space vertices; and generate a world-space axis-aligned bounding box (AABB) for the BLAS, wherein the world-space axis-aligned bounding box encloses the plurality of proxy geometry world-space vertices.

In another example, a non-transitory computer-readable medium is provided that has stored thereon instructions that, when executed by one or more processors, cause the one or more processors to: obtain a bottom-level acceleration structure (BLAS), the BLAS including one or more primitives of a scene object; calculate a proxy geometry for a plurality of vertices of the BLAS, the proxy geometry have a first number of vertices that is smaller than a number of vertices contained in the BLAS; transform the first number of vertices of the proxy geometry into a plurality of proxy geometry world-space vertices; and generate a world-space axis-aligned bounding box (AABB) for the BLAS, wherein the world-space axis-aligned bounding box encloses the plurality of proxy geometry world-space vertices.

In another example, an apparatus for ray tracing is provided. The apparatus includes: means for obtaining a bottom-level acceleration structure (BLAS), the BLAS including one or more primitives of a scene object; means for calculating a proxy geometry for a plurality of vertices of the BLAS, the proxy geometry having a first number of vertices that is smaller than a number of vertices contained in the BLAS; means for transforming the first number of vertices of the proxy geometry into a plurality of proxy geometry world-space vertices; and means for generating a world-space axis-aligned bounding box (AABB) for the BLAS, wherein the world-space axis-aligned bounding box encloses the plurality of proxy geometry world-space vertices.

According to another example, a method is provided for ray tracing. The method includes: obtaining a bottom-level acceleration structure (BLAS), the BLAS including a plurality of object-space vertices for one or more primitives of a scene object; transforming each vertex of the plurality of object-space vertices into a transformed world-space vertex; and generating a world-space axis-aligned bounding box (AABB) for the BLAS such that the world-space AABB encloses each transformed world-space vertex.

In another example, an apparatus for ray tracing is provided that includes a memory (e.g., configured to store data, such as virtual content data, one or more images, etc.) and one or more processors (e.g., implemented in circuitry) coupled to the memory. The one or more processors are configured to and can: obtain a bottom-level acceleration structure (BLAS), the BLAS including a plurality of object-space vertices for one or more primitives of a scene object; transform each vertex of the plurality of object-space vertices into a transformed world-space vertex; and generate a world-space axis-aligned bounding box (AABB) for the BLAS such that the world-space AABB encloses each transformed world-space vertex.

In another example, a non-transitory computer-readable medium is provided that has stored thereon instructions that, when executed by one or more processors, cause the one or more processors to: obtain a bottom-level acceleration structure (BLAS), the BLAS including a plurality of object-space vertices for one or more primitives of a scene object; transform each vertex of the plurality of object-space vertices into a transformed world-space vertex; and generate a world-space axis-aligned bounding box (AABB) for the BLAS such that the world-space AABB encloses each transformed world-space vertex.

In another example, an apparatus for ray tracing is provided. The apparatus includes: means for obtaining a bottom-level acceleration structure (BLAS), the BLAS including a plurality of object-space vertices for one or more primitives of a scene object; means for transforming each vertex of the plurality of object-space vertices into a transformed world-space vertex; and means for generating a world-space axis-aligned bounding box (AABB) for the BLAS such that the world-space AABB encloses each transformed world-space vertex.

In some aspects, one or more of the apparatuses described above is or is part of a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 7A illustrates an example of a scene object and an object-space bounding volume enclosing the scene object, in accordance with some examples of the present disclosure;

FIG. 7B illustrates an example of a scene object and a proxy geometry enclosing the scene object, in accordance with some examples of the present disclosure;

FIG. 8A illustrates an example of a world-space bounding volume enclosing the object-space bounding volume and scene object of FIG. 7A, in accordance with some examples of the present disclosure;

FIG. 8B illustrates an example of a maximally tight world-space bounding volume enclosing a scene object, in accordance with some examples of the present disclosure;

FIG. 8C illustrates an example of a tight world-space bounding volume enclosing the scene object and the proxy geometry of FIG. 7B, in accordance with some examples of the present disclosure;

DETAILED DESCRIPTION

Figure 1:
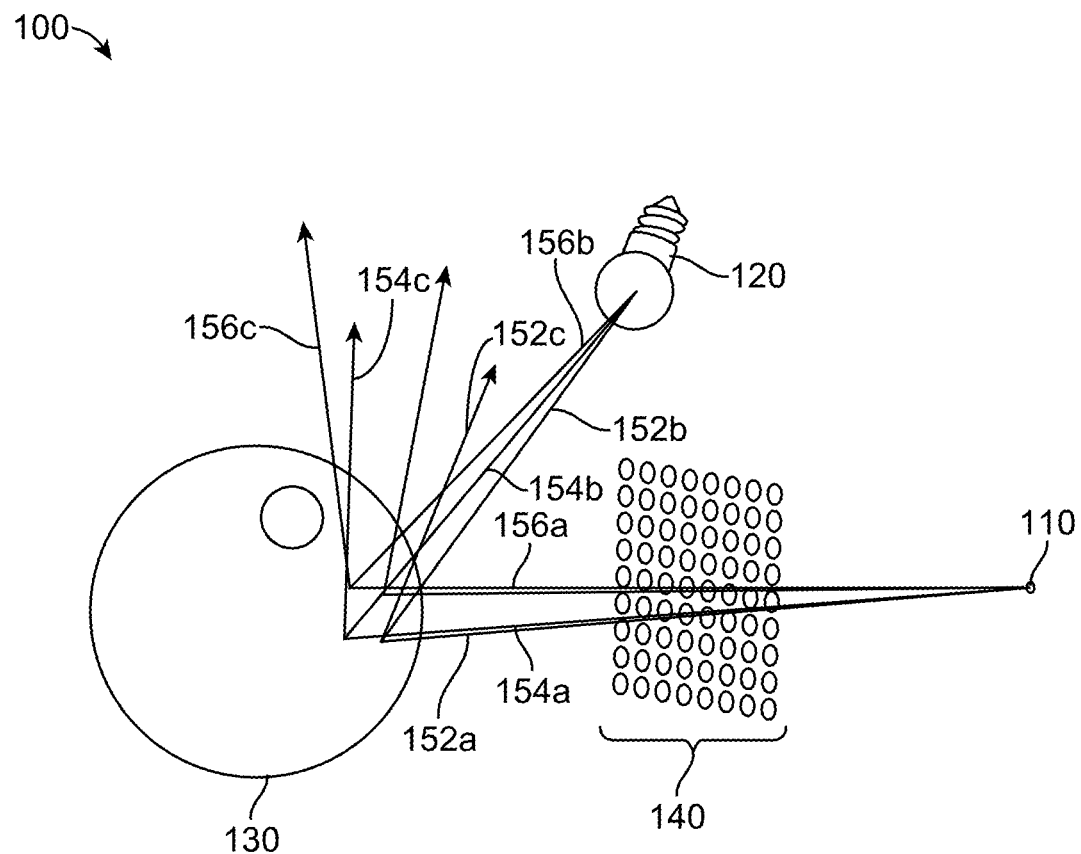
FIG. 1 illustrates an example of a ray tracing process, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Ray tracing is a graphics processing and rendering technique that can be used to produce photorealistic images by modeling light transport to simulate optical effects. Ray tracing can realistically simulate the lighting of a three-dimensional (3D) scene and its objects by rendering physically correct reflections, refractions, shadows, and indirect lighting in the two-dimensional (2D) view of the scene.

Ray tracing can be a computationally intensive technique. For example, the computational resources (e.g., compute time) used to ray trace a single frame can increase with the number of rays that are traced per frame and/or can increase with the computational resources (e.g., compute time) expended to trace each individual ray. Due to this computational complexity, ray tracing may often be limited to non-real time uses. Real-time ray tracing has long been sought after for uses such as rendering video games, virtual reality (VR) and augmented reality (AR) experiences, etc. Real-time ray tracing has recently become possible, using, for example, hardware acceleration units and/or graphics processing units (GPUs) that can provide parallelization of the underlying calculations for each individual ray that is projected into a scene.

The number of rays that can be projected into a scene for each frame is often relatively small, as the rendering time per frame cannot exceed some maximum amount without losing real-time performance. The image quality when using real-time ray tracing can be improved by increasing the number of rays projected into the scene per frame. This can be achieved by increased parallelization (e.g., providing additional computational resources that allow more rays to be traced simultaneously). However, hardware upgrades can carry high upfront costs and may be difficult or impossible to retrofit onto existing systems and platforms.

A scalable and efficient solution that can improve the real-time performance of existing ray tracing hardware is desirable. For example, the number of rays projected into the scene per frame can also be increased by tracing each ray more efficiently (e.g., reducing the compute time per ray trace operation allows more ray trace operations to be performed in the same fixed rendering time per frame). As described in more detail below, systems and techniques are described herein for providing accelerated ray tracing operations, such as by producing tight world-space bounding regions (e.g., bounding boxes) at a controlled computational cost.

FIG. 1 is a diagram illustrating an example of a ray tracing technique 100. As illustrated, a ray tracing system can perform ray tracing by casting a plurality of rays (e.g., ray 152a, ray 154a, and ray 156a) from a virtual or imaginary view camera 110 (e.g., which determines the view into the 3D scene), through the pixels 140 of a 2D viewing plane, out into the 3D scene. The ray tracing system can then trace the path of each ray to determine if the ray reaches back to a light source 120 in the 3D scene.

In this technique, each ray is projected through a particular pixel of the plurality of pixels 140 that are located on the 2D viewing plane. In the event a particular ray reaches a light source (e.g., light source 120) in the 3D scene, then information from that ray can be used to contribute to the final color and/or illumination level of the pixel (from the pixels 140) through which the particular ray was projected. For example, when rays projected into the scene intersect with one or more objects (e.g., such as object 130), color and lighting information from the point(s) of intersection on the object(s) surfaces can contribute to the final colors and illumination levels of the pixels associated with the rays. Similarly, different objects can have different surface properties that reflect, refract, and/or absorb light in different ways, which can also contribute to the final pixel colors and/or illumination level. Rays can also reflect off of objects and hit other objects in the scene, or travel through the surfaces of transparent objects, etc., before reaching a light source (e.g., light source 120).

For example, as illustrated in FIG. 1, ray 152a is projected into the scene and intersects object 130, resulting in generation of a first reflection ray 152b and a second reflection ray 152c. The first reflection ray 152b reaches light source 120 and consequently, can contribute color or illumination information for rendering the particular one of the pixels 140 through which ray 152 was projected. The second reflection ray 152c does not reach light source 120, and consequently, may not directly contribute color or illumination information back to the pixels 140. A same or similar scenario is illustrated for ray 154a and its first reflection ray 154b (which reaches light source 120) and second reflection ray 154c (which does not reach light source 120), as well as for ray 156a and its first reflection ray 156b (which reaches light source 120) and second reflection ray 156c (which does not reach light source 120).

As mentioned previously, each interaction between a ray and an object or surface within the 3D scene can contribute color and/or illumination information back to the particular pixel through which the ray was projected. In some cases, tracing a greater number of interactions per ray can provide increased visual fidelity (e.g., quality) of the rendered scene at the expense of increased computational cost (e.g., time). For example, a ray tracing approach that prioritizes speed over quality might calculate or otherwise determine only the first reflection for each ray, while a ray tracing approach that prioritizes quality over speed might determine three or more reflections per ray. In some cases, after observing either a maximum number of reflections or a ray traveling a certain distance without intersection), the ray can cease to travel and the pixel's value can be updated. In some cases, the ray can cease to travel and the pixel's value can be updated based on a ray traveling a certain distance without reflection (e.g., reflection being one possible outcome of an intersection). In some cases, the number of rays that are projected through each pixel of the 2D viewing plane can be adjusted based on a similar tradeoff between computational cost and visual fidelity.

Ray tracing can therefore become very costly in terms of the time and/or computational power that is required to render realistic-looking scenes, based, for example, on the number of rays projected into the scene and the number of additional rays that are traced for secondary reflections and refractions. Due to this computational complexity, ray tracing is typically limited to non-real time uses (e.g., scenes or visual effects that could be rendered in advance for film and television). Real-time ray tracing has long been sought after for use cases such as rendering video games, virtual reality (VR) and augmented reality (AR) experiences, etc.

Real-time ray tracing has recently become possible and is often performed by hardware acceleration units and/or graphics processing units (GPUs) that can provide parallelization of the underlying calculations for each individual ray that is projected into the scene. The number of rays that can be projected into the scene for each frame is often relatively small, as the rendering time per frame cannot exceed some maximum amount without losing real-time performance.

The image quality when using real-time ray tracing can be improved by increasing the number of rays projected into the scene per frame. This can be achieved by increased parallelization (e.g., providing additional computational resources that allow more rays to be traced simultaneously). However, hardware upgrades can carry high upfront costs and may be difficult or impossible to retrofit onto existing systems and platforms. A scalable and efficient solution that can improve the real-time performance of existing ray tracing hardware is desirable. For example, the number of rays projected into the scene per frame can also be increased by tracing each ray more efficiently (e.g., reducing the compute time per ray trace operation allows more ray trace operations to be performed in the same fixed rendering time per frame).

Figure 2A:
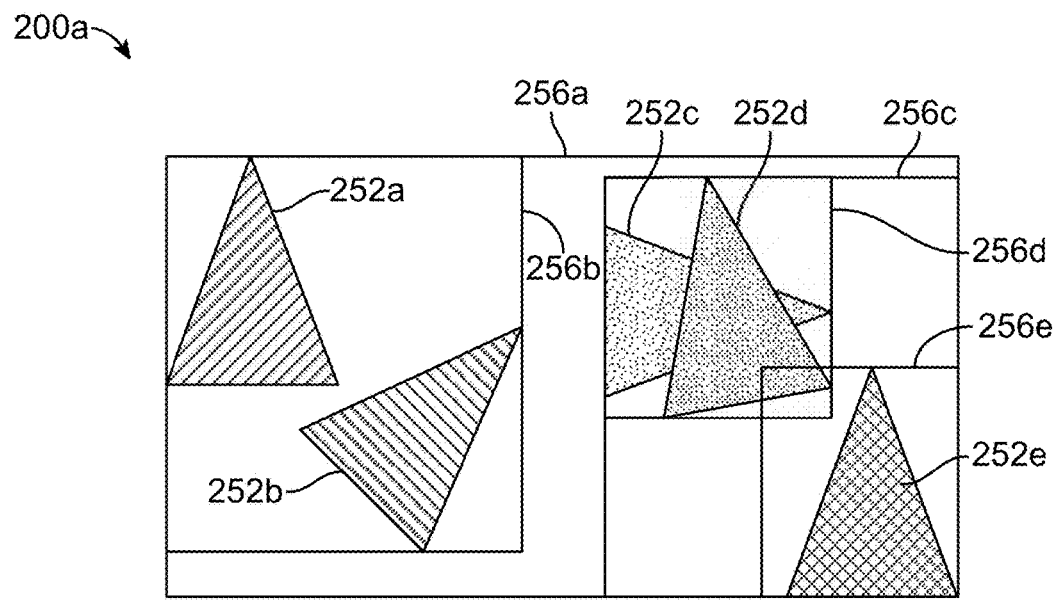
FIG. 2A illustrates an example of bounding volumes including one or more primitives representing portions of surfaces in a scene, in accordance with some examples.
Figure 2B:
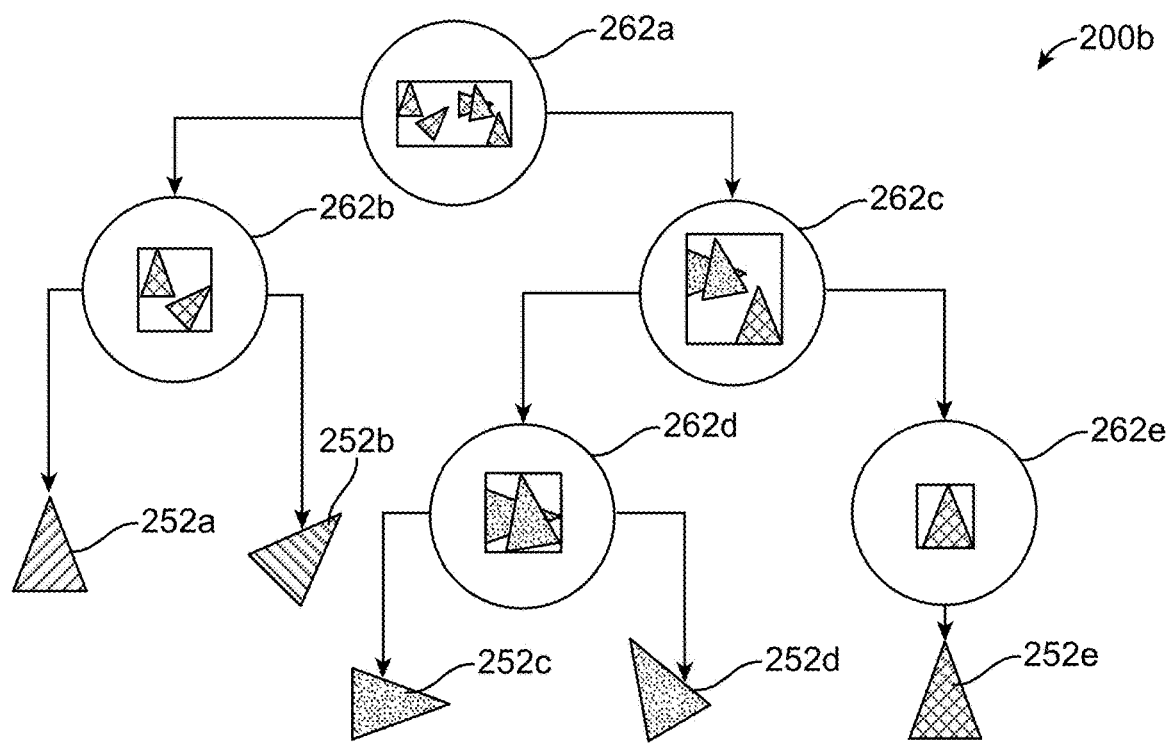
FIG. 2B illustrates an example of a bounding volume hierarchy (BVH) organizing the bounding volumes of FIG. 2A, in accordance with some examples.

One example of a ray tracing acceleration technique utilizes tree-based acceleration structures to improve the efficiency of ray intersection tests. For example, scenes can be converted into bounding volume hierarchies (BVHs), which are hierarchical tree structures composed of ever-tighter bounding volumes (also referred to as "bounding regions" such as bounding boxes or "axis-aligned bounding boxes" (AABBs)). For example, FIG. 2A illustrates an example structure 200a in which a scene containing a plurality of triangle primitives 252a-252e is arranged into a series of ever-tighter bounding boxes 256a-256e. Scenes may contain hundreds, thousands, or more primitives, but for purposes of clarity, only the five triangle primitives 252a-252e are depicted. The bounding boxes 256a-256e can be AABBs, which are bounding boxes having a minimized area or volume within which all points of the enclosed primitives (e.g., triangle primitives 252a-252e) may lie. The bounding boxes may be axis-aligned such that the edges of each bounding box 256a-256e are parallel to a coordinate axis (e.g., the x, y, and z axes). FIG. 2B illustrates an example hierarchical data structure 200b having nodes that are associated with the bounding boxes 256a-256e and triangle primitives 252a-252e shown in FIG. 2A. The hierarchical data structure 200b can be a BVH. For example, a BVH root node 262a can correspond to the bounding box 256a shown in FIG. 2A; similarly, an intermediate BVH node 262b can correspond to the bounding box 256b of FIG. 2A; intermediate BVH node 262c can correspond to the bounding box 256c of FIG. 2A, and so on.

A BVH root node (e.g., BVH root node 262a of FIG. 2B) contains an AABB (e.g., bounding box 256a of FIG. 2A) enclosing all the individual scene or object geometry contained in the BVH leaf nodes. Each primitive in the BVH root node is assigned to either the left or right child node. The child nodes contain the AABBs containing their assigned geometry, and this geometry is likewise assigned to left or right child nodes, recursively until the BVH leaf nodes contain a small number of primitives, e.g., four or fewer. Depending on the extent of any scene changes and/or object deformations, the next and any subsequent frames may require one or more new BVH build operations or BVH refitting/update operations based on the scene changes.

Testing each ray for intersection against every primitive in the scene can be inefficient and computationally expensive. BVHs can be used to accelerate ray intersection testing techniques. For example, each ray can be tested for intersection against BVH bounding boxes using a depth-first tree traversal process instead of against every primitive in the scene. As mentioned previously, bounding boxes encompass or surround different amounts of scene geometry or primitives and become increasingly tighter with the depth of the BVH tree structure.

Figures 3A, 3B:
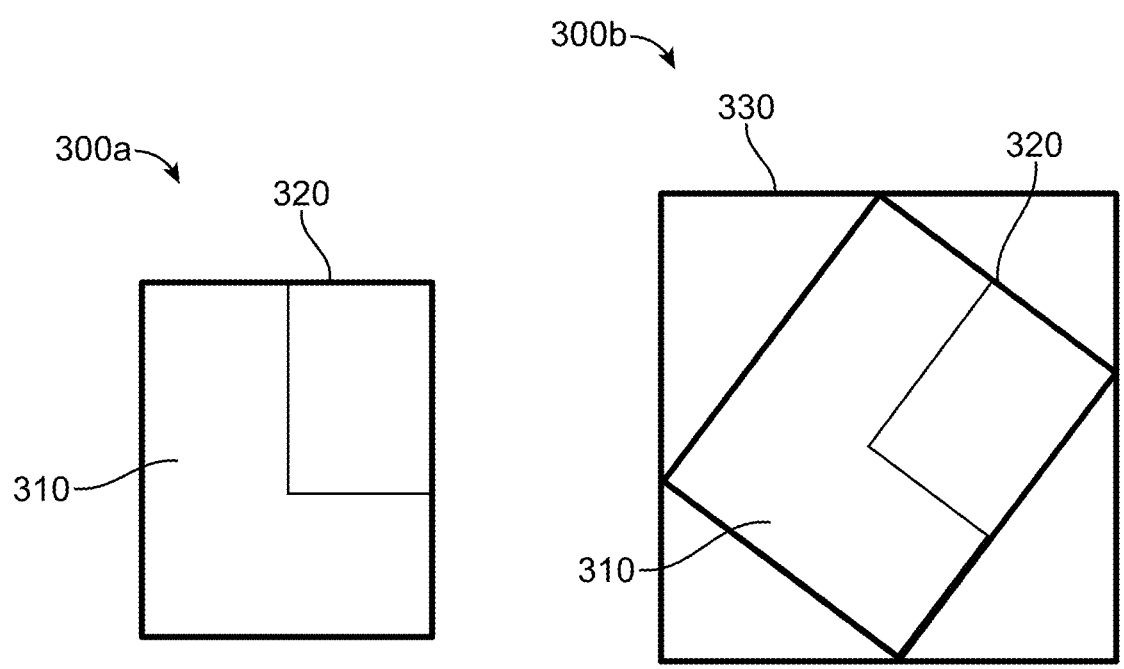
FIG. 3A illustrates an example of a scene object and an object-space bounding volume enclosing the scene object, in accordance with some examples.
FIG. 3B illustrates an example of a world-space bounding volume enclosing the object-space bounding volume and scene object of FIG. 3A, in accordance with some examples.

Bounding boxes (e.g., AABBs or other bounding boxes) or other bounding regions can be defined with respect to world-space or object-space. World-space can be considered a constant (e.g., the coordinate space of the overall 3D scene). Objects can exist in their own coordinate space, which is referred to as object-space (e.g., the coordinate space in which the object was modeled or created). For example, FIGS. 3A and 3B are diagrams depicting object-space and world-space AABBs (axis-aligned bounding boxes) for the same geometry. Here, FIG. 3A illustrates an object-space AABB 320 of a geometric scene object 310. Scene objects can include the 3D or graphical objects that are present in a 3D scene for which ray tracing is performed. In some cases, geometric scene objects can be scene objects that include geometric primitives such as triangles. In some examples, scene objects can include AABBs or other object representations. Object-space AABB 320 and scene object 310 are both shown in the object-space 300a of the scene object 310. FIG. 3B illustrates the same geometric scene object 310 but transformed into the world-space 300b of the scene (e.g., the scene to which scene object 310 belongs or is located). A world-space AABB 330 (or other world-space bounding box) encloses both the object-space AABB 320 and the scene object 310.

Figure 4:
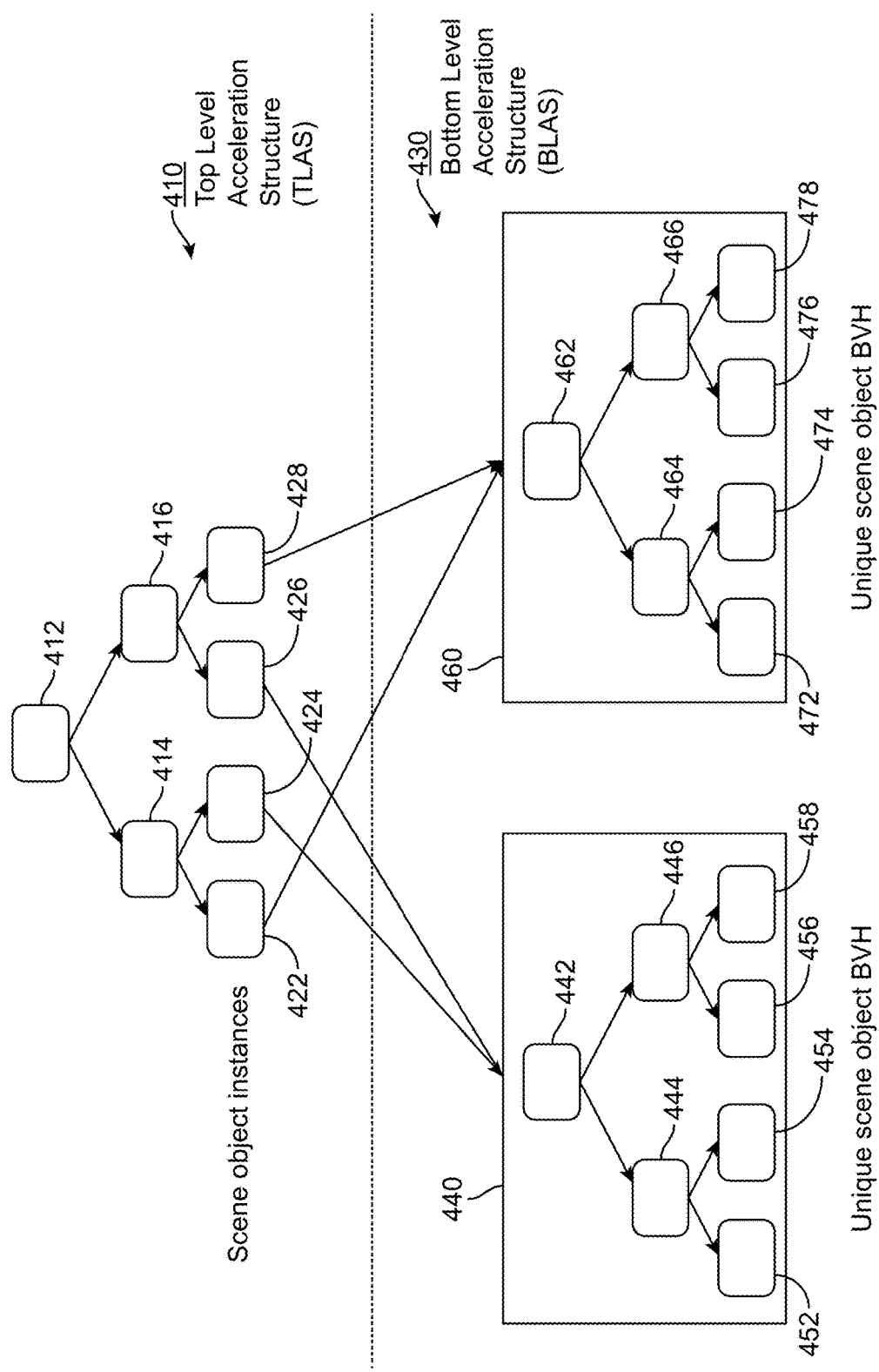
FIG. 4 illustrates an example of an acceleration data structure including a top-level acceleration structure (TLAS) and a bottom-level acceleration structure (BLAS), in accordance with some examples.

Ray tracing can utilize a two-level acceleration structure system, such as a top-level acceleration structure (TLAS) and a bottom-level acceleration structure (BLAS), as depicted in FIG. 4. For example, FIG. 4 illustrates a TLAS 410 and a BLAS 430, which are described in greater depth below.

The TLAS 410 is built in world-space. TLAS primitives are instances of BLASs, which are defined in object-space. A TLAS can be constructed as a BVH with leaf nodes (including leaf nodes 412, 414, 416, 422, 424, 426, and 428) containing a BLAS. For example, the TLAS leaf nodes 422, 424, 426, and 428 each contain or are otherwise associated with one of the two BLASs 440 and 460. A translation matrix can be encoded in the TLAS leaf node to perform conversion from world-space to object-space and/or vice versa, as described in greater depth below.

A BLAS can be constructed for each object in a scene, referred to as a scene object. For example, FIG. 4 illustrates a BLAS 440 that may be constructed for a first unique scene object and a BLAS 460 that may be constructed for a second unique scene object. BLAS 440 includes leaf nodes 442, 444, 446, 452, 454, 456, and 458 and BLAS 460 includes leaf nodes 462, 464, 466, 472, 474, 476, and 478. BLAS primitives can be the triangles or the AABBs of procedural primitives used to build the scene object. A bottom level BVH is built over the set of these triangles or AABBs of the scene object, with each BLAS leaf node containing a small number (e.g., up to four, five, or some other number) of triangles or AABBs. For example, in the context of FIG. 4, the BLAS leaf nodes 452-458 and 472-478 can each contain some quantity of triangles, AABBs, or other primitives used to build the scene object. In some examples, a BLAS can also be referred to as a "bottom level BVH." Multiple instances of the same BLAS can be included in a TLAS. For example, if a TLAS includes a car object, then a BLAS of a tire can be included four times. The same BLAS can also be included in or referenced by multiple TLASs, as illustrated in FIG. 4.

In some examples, a TLAS can be created using an Object-To-World matrix, which transforms an input represented in object-space coordinates to an output representation in world-space coordinates. A World-To-Object matrix can apply the transformation in the opposite direction (e.g., transforming an input represented in world-space coordinates to an output representation in object-space coordinates). In some cases, a TLAS can be built over a set of BLASs by using the Object-To-World matrix to compute the world-space AABB of each BLAS (e.g., the world-space AABB of the BLAS root nodes 442 and 462). A BVH is then built over these world-space AABBs of the BLAS root nodes and can be referred to as a top level BVH or the TLAS 410. In some cases, TLAS and BLAS creation can be performed using a similar or identical technique. For example, the same SAH-based (Surface Area Heuristic) algorithm or approach can be utilized for both TLAS and BLAS construction.

Figure 5A:
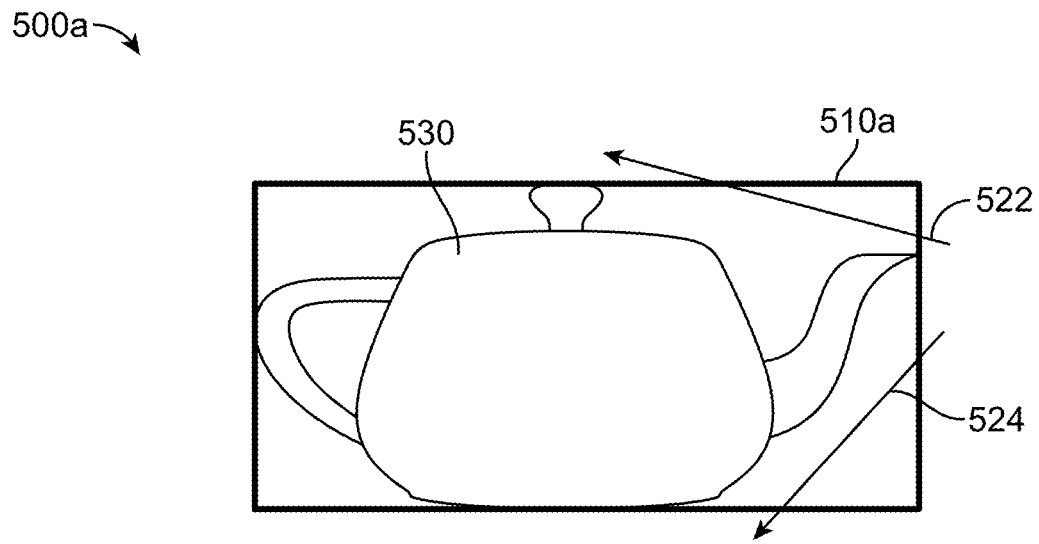
FIG. 5A illustrates an example of a relatively loose, non-tight bounding volume enclosing a scene object, in accordance with some examples.
Figure 5B:
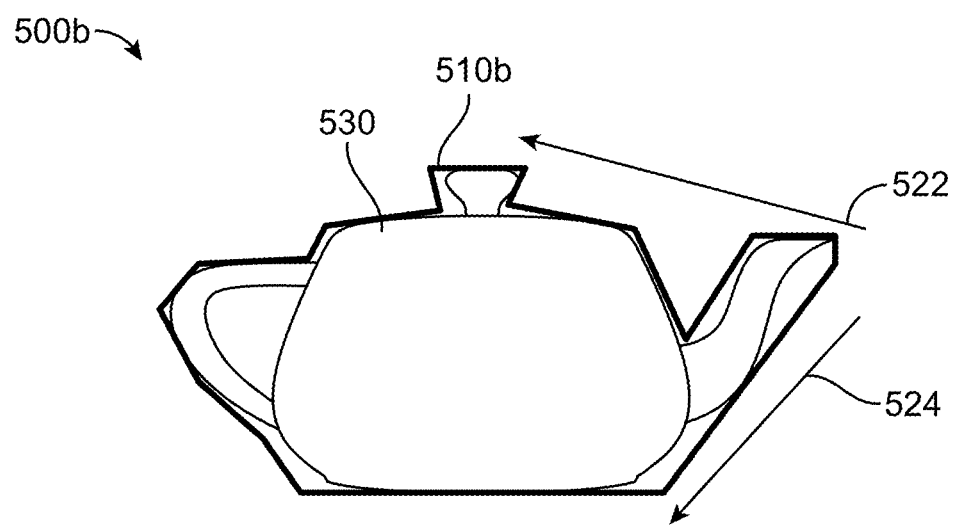
FIG. 5B illustrates an example of a relatively tight bounding volume enclosing the scene object of FIG. 5A, in accordance with some examples.

In some cases, the performance of BVH-accelerated ray tracing can depend on the tightness of the world-space AABBs generated for the BLAS included in or associated with a TLAS leaf node. For example, a tight bounding box will usually outperform a loose bounding box because fewer rays enter the BLAS, and moreover, rays that do enter the BLAS are less likely to pass through empty space. FIG. 5A is a diagram 500a illustrating an example of a relatively loose bounding box 510a that encloses a scene object 530. As shown, the bounding box 510a is considered loose as there is a large amount of empty space between the boundary of the bounding box 510a and the scene object 530. FIG. 5B is a diagram 500b illustrating an example of a relatively tight bounding box 510b that encloses the same scene object 530. As illustrated, the bounding box 510b is tighter compared to the bounding box 510a of FIG. 5A, as there is very little empty space between the boundary of the bounding box 510b and the scene object 530.

When a ray intersects a BLAS bounding box, the ray is automatically checked for lower-level intersection against each of the constituent primitives within the BLAS. A ray that hits only empty space within the bounding box surrounding a BLAS therefore represents wasted computational work (and increased time/decreased efficiency). In the example of FIG. 5A, the two rays 522 and 524 both intersect the relatively loose bounding box 510a, but neither ray actually intersects the scene object 530. As such, the ray intersections determined for rays 522 and 524 with the loose bounding box 510a will result in wasted computational work, because the rays 522 and 524 in actuality pass through empty space despite their intersection with the loose bounding box 510a.

In the example of FIG. 5B, the same two rays 522 and 524 are shown. Here, because a relatively tight bounding box 510b is used to enclose the scene object 530, neither of the two rays intersect with the bounding box 510b. Therefore, unlike when loose bounding box 510a was used to enclose scene object 530, neither of the rays 522 and 524 will result in an intersection with the bounding box 510b and thus avoids wasted computational work.

Reducing wasted computational resources by generating tighter world-space bounding boxes is desirable. World-space bounding boxes can include bounding boxes (e.g., AABBs) with coordinates given in world-space, rather than in object-space or other coordinate systems. In some cases, a world-space bounding box can be represented as an object-space bounding box by transforming its world-space coordinates to object-space coordinates (e.g., using a World-to-Object matrix). However, computing tighter world-space bounding boxes is itself associated with a computational overhead that may be incurred each time an updated volume (e.g., BVH) or new volume (e.g., BVH) is generated in response to scene changes between frames. In this case, generating tight world-space bounding boxes for TLAS leaf nodes at a controlled computation cost becomes more desirable.

Systems, apparatuses, processes (also referred to as methods), and computer readable media (collectively referred to as "systems and techniques") are described herein that can provide accelerated ray tracing operations by producing tight world-space bounding regions (e.g., bounding boxes such as AABBs) at a controlled computational cost. Bounding boxes will be used herein as examples of bounding regions. However, any type of bounding regions can be used that are not necessarily "boxes," such as polygons, circles, ellipses, or other shape of bounding region. In some aspects, tight world-space bounding boxes can be determined using one or more ray tracing acceleration data structures. In some examples, the ray tracing acceleration data structure can include a bounding volume hierarchy (BVH) and/or a hierarchical tree. Different approaches to calculating world-space bounding boxes can offer different tradeoffs between computational overhead and ray tracing performance, as will be described in greater depth below.

Figure 6:
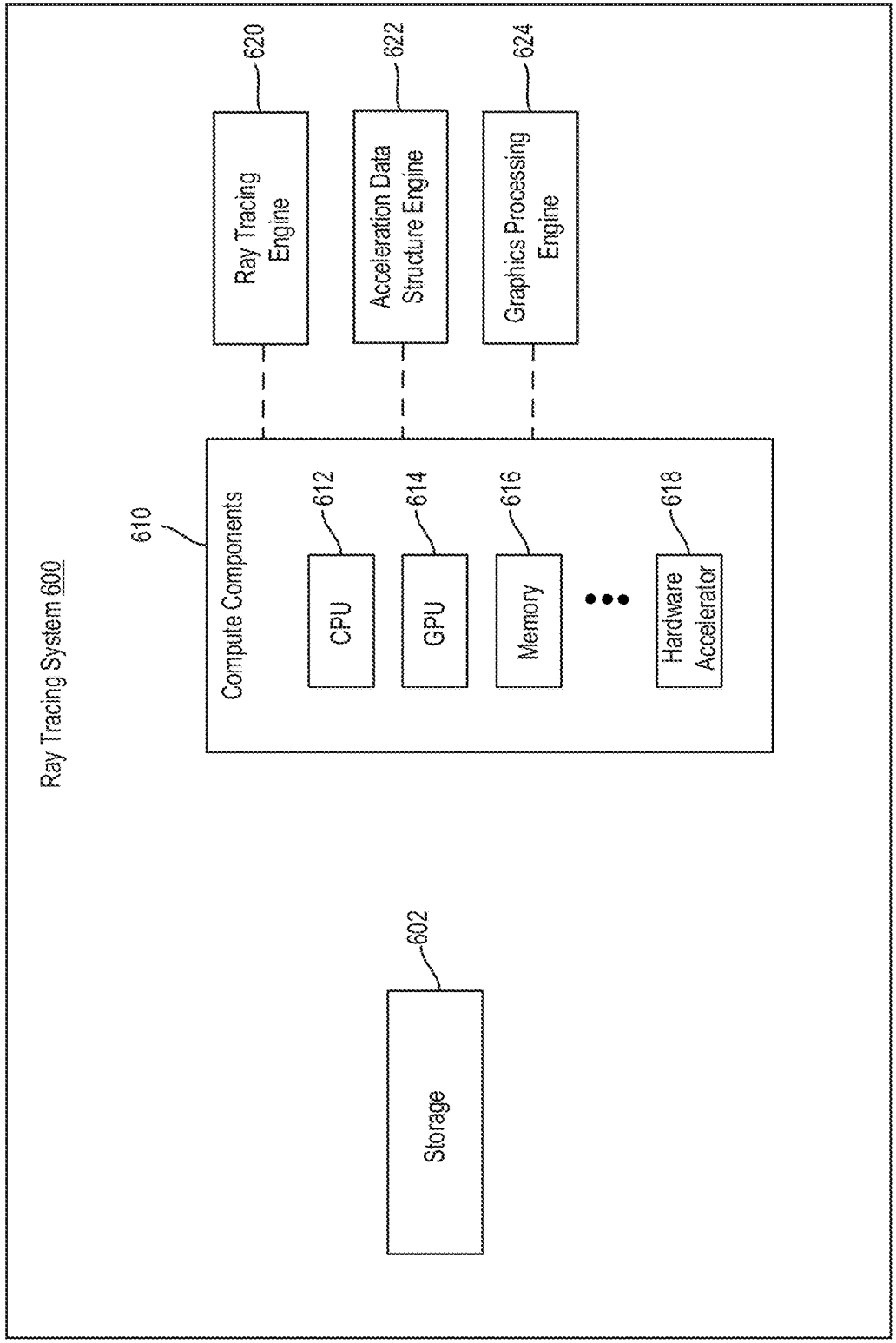
FIG. 6 is a simplified block diagram illustrating an example ray tracing system, in accordance with some examples of the present disclosure.

FIG. 6 is a diagram illustrating an example ray tracing system 600, in accordance with some examples of the disclosure. The ray tracing system 600 can implement the systems and techniques disclosed herein, including aspects associated with FIGS. 7A-9E. The ray tracing system 600 can perform various tasks and operations such as, for example, ray tracing tasks and operations (e.g., ray-primitive intersection, ray-bounding volume intersection, ray-AABB intersection, acceleration data structure construction and/or updating, rendering, etc.).

In the example shown in FIG. 6, the ray tracing system 600 includes storage 602, compute components 610, a ray tracing engine 620, an acceleration data structure engine 622, and a graphics processing engine 624. It should be noted that the components 602 through 624 shown in FIG. 6 are non-limiting examples provided for illustration and explanation purposes, and other examples can include more, less, and/or different components than those shown in FIG. 6. For example, in some cases the ray tracing system 600 can include one or more display devices, one more other processing engines, one or more other hardware components, and/or one or more other software and/or hardware components that are not shown in FIG. 6. An example architecture and example hardware components that can be implemented by the ray tracing system 600 are further described below with respect to FIG. 11.

References to any of the components of the ray tracing system 600 in the singular or plural form should not be interpreted as limiting the number of such components implemented by the ray tracing system 600 to one or more than one. For example, references to a processor in the singular form should not be interpreted as limiting the number of processors implemented by the ray tracing system 600 to one. One of ordinary skill in the art will recognize that, for any of the components shown in FIG. 6, the ray tracing system 600 can include only one of such component (s) or more than one of such component(s).

The ray tracing system 600 can be part of, or implemented by, a single computing device or multiple computing devices. In some examples, the ray tracing system 600 can be part of an electronic device (or devices) such as a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, an extended reality (XR) device (e.g., a VR headset or head-mounted display (HMD), an AR headset, HMD, or glasses, etc.), or any other suitable electronic device(s).

In some implementations, the storage 602, compute components 610, ray tracing engine 620, acceleration data structure engine 622, and graphics processing engine 624 can be part of the same computing device. For example, in some cases, the storage 608, compute components 610, ray tracing engine 620, acceleration data structure engine 622, and graphics processing engine 624 can be integrated into a smartphone, laptop, tablet computer, smart wearable device, gaming system, and/or any other computing device. In other implementations, the storage 602, compute components 610, ray tracing engine 620, acceleration data structure engine 622, and graphics processing engine 624 can be part of two or more separate computing devices. For example, in some cases, some of the components 602 through 624 can be part of, or implemented by, one computing device and the remaining components can be part of, or implemented by, one or more other computing devices.

The storage 602 can be any storage device(s) for storing data. Moreover, the storage 602 can store data from any of the components of the ray tracing system 600. For example, the storage 602 can store data from the compute components 610, data from the ray tracing engine 620, data from the acceleration data structure engine 622, and/or data from the graphics processing engine 624. In some examples, the storage 602 can include a buffer for storing data for processing by the compute components 610.

The compute components 610 can include a central processing unit (CPU) 612, a graphics processing unit (GPU) 614, a memory 616, and/or one or more hardware accelerator components 618. In some implementations, the compute components 610 can include other processors or compute components, such as one or more digital signal processors (DSPs), one or more neural processing units (NPUs), and/or other processors or compute components. The compute components 610 can perform various operations such as ray-primitive intersection, ray-bounding volume intersection, ray-AABB intersection, acceleration data structure construction, acceleration data structure updating, scene rendering, rasterization, geometry processing, pixel processing, visibility processing, etc.

The operations for the ray tracing engine 620, the acceleration data structure engine 622, and the graphics processing engine 624 (and any other processing engines) can be implemented by any of the compute components 610. In one illustrative example, the operations of one or more of the ray tracing engine 620, the acceleration data structure engine 622, and the graphics processing engine 624 can be executed by the GPU 614. In some cases, the operations of one or more of the ray tracing engine 620, the acceleration data structure engine 622, and the graphics processing engine 624 can be executed by the CPU 612.

In some cases, the operations of one or more of the ray tracing engine 620, the acceleration data structure engine 622, and the graphics processing engine 624 can be executed by a combination of CPU 612 and GPU 614. In some cases, the compute components 110 can include other electronic circuits or hardware, computer software, firmware, or any combination thereof, to perform any of the various operations described herein.

In some examples, the ray tracing engine 620 can include one or more ray tracing Application Programming Interfaces (APIs). In one illustrative example, the ray tracing engine 620 can include one or more ray intersection engines. For example, ray tracing engine 620 can include one or more ray-primitive intersection engines and/or can include one or more ray-bounding volume intersection engines. In some cases, ray tracing engine 620 can include one or more ray-triangle intersection engines and/or can include one or more ray-AABB intersection engines. In some examples, the ray tracing engine 620 can implement one or more ray intersection engines using one or more hardware-accelerated ray tracing units (RTUs) and/or arithmetic logic units (ALUs).

In some examples, the acceleration data structure engine 622 can construct or generate one or more acceleration data structures. The acceleration data structures generated by acceleration data structure engine 622 can be used by one or more of ray tracing engine 620 and graphics processing engine 624. In one illustrative example, acceleration data structure engine 622 can construct or generate a Bounding Volume Hierarchy (BVH). In some cases, acceleration data structure engine 622 can generate two-level acceleration structures (e.g., an acceleration data structure including a TLAS and one or more BLASs). The acceleration data structure engine 622 can be implemented using the CPU 612, the GPU 614, or a combination of the two. In some examples, the acceleration data structure engine 622 can additionally, or alternatively, be implemented using one or more of the dedicated hardware accelerator components 618.

In some examples, the graphics processing engine 624 can include a graphics processing pipeline. For example, graphics processing engine 624 can include, but is not limited to, one or more of a geometry processing stage, a visibility stage, a rasterization stage, and a pixel processing pipeline. In some examples, graphics processing engine 624 can communicate with or access the memory 616 of the compute components 610. Memory 616 can include one or more of a system memory, a frame buffer, a graphics memory, one or more caches, etc.

In some cases, the ray tracing system 600 (e.g., using the ray tracing engine 620, the acceleration data structure engine 622, and/or the graphics processing engine 624) can obtain an acceleration data structure that includes one or more primitives of a scene object. For example, the ray tracing system 600 can obtain the acceleration data structure from storage 602 and/or memory 616. In some cases, the acceleration data structure can be generated or constructed using the acceleration data structure engine 622.

When the ray tracing system 600 obtains an acceleration data structure, the ray tracing engine 620 can apply a graph cut to the acceleration data structure. A graph cut is a partition of the vertices of a graph into two disjoint subsets (e.g., a graph cut divides the vertices of the graph are into a first subset and a second subset, where no vertices are present in both the first subset and the second subset) In some examples, the acceleration data structure engine 622 can apply a graph cut to the acceleration data structure. In some cases, the ray tracing engine 620 and the acceleration data structure engine 622 can work in combination to apply a graph cut to the acceleration data structure.

In some aspects, the ray tracing system 600 (e.g., using the ray tracing engine 620, the acceleration data structure engine 622, and/or the graphics processing engine 624) can determine a set of nodes of the acceleration data structure based on the graph cut. The set of nodes determined by the ray tracing system 600 can be located adjacent to the graph cut, as will be described in greater depth below with respect to the example graph cuts illustrates in FIGS. 9A and 9B. In some examples, a set of nodes adjacent to a graph cut can be located immediately above the graph cut line (e.g., the graph cut line separates the set of nodes and their child nodes). In some cases, a set of nodes adjacent to a graph cut can be located immediately below the graph cut line (e.g., the graph cut line separates the set of nodes and their parent nodes). In some examples, the ray tracing system 600 can determine the set of nodes based on the graph cut using the ray tracing engine 620 and/or the acceleration data structure engine 622.

In some cases, the ray tracing system 600 (e.g., using the ray tracing engine 620, the acceleration data structure engine 622, and/or the graphics processing engine 624) can generate a world-space bounding box for a scene object. For example, the ray tracing system 600 can generate a world-space bounding box for the scene object that is associated with or included in the obtained acceleration data structure described previously above. In some cases, the world-space bounding boxes can be AABBs. In one illustrative example, the ray tracing system 600 can generate the world-space bounding boxes for a set of nodes determined based on a graph cut, using the acceleration data structure engine 622 (and/or the ray tracing engine 620).

The acceleration data structure engine 622 can obtain one or more representations of a scene object or other scene geometry and generate and/or update a BVH or other acceleration data structure that includes the scene object or scene geometry. In some examples, the acceleration data structure engine 622 can obtain representations of a scene object or other scene geometry at least in part from one or more of the storage 602 and the memory 616. In some cases, the acceleration data structure engine 622 can obtain representations of a scene object or other scene geometry from the ray tracing engine 620 (and/or one or more of the compute components 610).

The acceleration data structure engine 622 can operate over representations of scene objects and scene geometry using both object-space representations and world-space representations. In some examples, the acceleration data structure engine 622 can use one or more Object-To-World matrices and/or World-To-Object matrices to transform scene objects/geometry from object-space representations into world-space representations, and from world-space representations to object-space representations, respectively.

The following discussion makes reference to the examples of FIGS. 7A and 7B, which both depict a scene object 710 in its object-space (e.g., prior to scene object 710 being transformed into a world-space representation according to one or more aspects of the systems and techniques described herein). Scene object 710 can include a plurality of geometric primitives each having one or more vertices. For instance, scene object 710 can include a plurality of triangles, polygons, procedural primitives, etc. In some examples, scene object 710 can be represented by and/or stored in an acceleration data structure, such as a BVH or hierarchical tree. For example, scene object 710 can be represented by or stored in a BLAS, as previously discussed above. The BLAS containing scene object 710 can itself be contained in, referenced, or pointed to by one or more TLAS leaf nodes. For instance, as noted above with respect to FIG. 4, a given BLAS can include a BVH for a unique scene object and therefore may be included in multiple different TLAS leaf nodes.

As illustrated, FIG. 7A depicts scene object 710 enclosed by an object-space bounding box 720. In some examples, the object-space bounding box 720 is an object-space AABB determined for scene object 710. In some cases, object-space bounding box 720 can be the BLAS root node AABB (e.g., because object-space bounding box 720 includes all of the geometry and/or primitives that comprise scene object 710).

FIG. 7B illustrates the same scene object 710 enclosed by a proxy geometry 740. In some examples, the proxy geometry 740 can be a convex hull or a convex hull approximation. In some examples, the proxy geometry 740 can be a bounding box (e.g., AABB). The proxy geometry 740 (whether a convex hull, convex hull approximation, or otherwise) can be determined based on object-space vertices associated with scene object 710. For example, where scene object 710 is stored as a BLAS, proxy geometry 740 can be determined based on the object-space vertices of the BLAS (e.g., proxy geometry 740 can be the convex hull of the BLAS root node). In some cases, proxy geometry 740 can be determined based on the object-space vertices of the geometry and/or primitives stored within the BLAS.

The following discussion also makes reference to the example of FIG. 8A, which depicts the object-space view 700a of FIG. 7A as transformed into a world-space view 800a. For example, as depicted in FIG. 8A, scene object 710 and its associated object-space AABB 720 have both been transformed from object-space into world-space (e.g., using an Object-To-World matrix). Transformed scene object 710 and transformed object-space AABB 720 are further shown as being enclosed within a world-space bounding box 830.

In some examples, one or more of the world-space view 800a, the scene object 710, the object-space AABB 720, and/or the calculated world-space bounding box 830 depicted in FIG. 8A can be the same as or similar to the world-space 300b, the scene object 310, the object-space AABB 320, and/or the calculated world-space bounding box 330 depicted in FIG. 3B, respectively.

In some examples, the world-space bounding box 830 can be a world-space AABB calculated to enclose the world-space transformed vertices of object-space AABB 720. Where the world-space bounding box 830 encloses all of the world-space transformed vertices of object-space AABB 720, it is noted that world-space bounding box 830 will also enclose each individual vertex of the geometry and/or primitives included in scene object 710 (e.g., because the individual vertices of scene object 710 are themselves enclosed by object-space AABB 720).

As mentioned above, in some cases object-space AABB 720 can be a BLAS root node AABB, in which case world-space AABB 830 may be generated for one or more TLAS leaf nodes that contain the BLAS/BLAS root node. In one illustrative example, the systems and techniques described herein can transform vertices (e.g., vertices corresponding to the eight corners) of the BLAS root node AABB 720 (e.g., the AABB of the root node of the BLAS associated with the TLAS leaf node) into world-space and place the world-space AABB 830 around the vertices (e.g., the eight transformed corners/vertices).

The world-space AABB 830 that is generated from the vertices or corners of the object-space AABB 720 enclosing scene object 710 can be used (e.g., by the ray tracing system 600) to perform one or more ray tracing operations. In one illustrative example, continuing in the scenario above in which object-space AABB 720 and scene object 710 are stored in a BLAS that is itself associated with a TLAS leaf node, the generated world-space AABB 830 can be used (e.g., by the ray tracing system 600) to perform ray tracing operations such as ray intersection tests. For example, if a ray projected into the scene is determined by the ray tracing system 600 to intersect the world-space AABB 830 generated for a TLAS leaf node, then the BLAS associated with that TLAS leaf node will be traversed and further ray intersection tests will be performed for the child nodes and/or leaf nodes of the BLAS; if a ray projected into the scene is determined by the ray tracing system 600 as not intersecting the world-space AABB 830 generated for a TLAS leaf node, then the BLAS associated with that TLAS leaf node need not be traversed.

As such, it can be desirable to generate a world-space AABB (e.g., such as world-space AABB 830) that is tight with respect to the actual geometry or primitives contained within the BLAS or object-space AABB associated with a TLAS leaf node, as has been described above. However, approaches that generate world-space AABBs for TLAS leaf nodes based on transforming only the eight corners/vertices of object-space AABB 720 into world-space often result in an overly loose (e.g., non-tight) bounding box. World-space AABB 830 is an example of a loose or non-tight bounding box, as world-space AABB 830 can be seen to include significant amounts of empty space beyond the volume occupied by scene object 710 and beyond the volume occupied by object-space AABB 720.

As noted above, the ray tracing system 600 can implement the systems and techniques described herein to provide accelerated ray tracing operations by producing world-space bounding boxes that are tight to an underlying scene object and have a controlled computational cost. In one illustrative example, the ray tracing system 600 can use object-space representations of scene objects and/or scene primitives to generate world-space bounding boxes with greater tightness relative to an underlying scene object, as will be described in greater depth below. In some examples, the generated world-space bounding boxes can be world-space AABB s.

In a first approach, the ray tracing system 600 can obtain a maximally tight world-space bounding box for a scene object or other set of scene primitives by individually transforming each vertex of the scene object/scene primitives from an object-space representation to a world-space representation. A world-space bounding box subsequently calculated over the resulting set of all the transformed world-space vertices (e.g., the object-space vertices of the scene object that have been transformed into world-space representations) will have a maximal tightness relative to the underlying scene object.

FIG. 8B illustrates an example of this first approach. In particular, FIG. 8B is a diagram 800b illustrating an example of a scene object 710 that has been transformed into world-space and enclosed by a maximally tight world-space bounding box 850. In some cases, the maximally tight world-space bounding box 850 can be an AABB. The scene object 710 depicted in FIG. 8B can be the same as the scene object 710 depicted in FIGS. 7A-8A and described above. It is noted that, in comparison to the relatively loose world-space bounding box 830 of FIG. 8A, the maximally tight world-space bounding box 850 of FIG. 8B is computed for the same scene object 710 yet includes significantly less empty space beyond the volume occupied by scene object 710.

In some examples, the ray tracing system 600 can obtain the maximally tight world-space bounding box/AABB 850 by transforming each vertex associated with the geometry of scene object 710 from object-space to world-space, using, for example, an Object-To-World matrix as previously described above. In one illustrative example, the ray tracing system 600 can calculate or otherwise determine the maximally tight world-space AABB 850 for a TLAS leaf node. The TLAS leaf node can contain or otherwise be associated with a BLAS that was previously constructed for a given scene object such as scene object 710.

Because ray tracing performance can depend on bounding box or AABB tightness, this first approach of individually transforming each vertex of the scene primitives from object-space to world-space can offer the highest ray tracing performance as compared to other approaches described herein. In some examples, this first approach may be associated with a higher computational cost as compared to the other approaches described below. This higher computational cost can arise due to the individual transformation of each object-space vertex into a world-space vertex, especially as the number of vertices per BLAS or TLAS increases. In some cases, when the BVH associated with a TLAS and/or a BLAS is updated or otherwise changed, the first approach may calculate a new AABB by re-computing individual object-to-world vertex transformations. In some examples, the BVH associated with a TLAS or a BLAS may be updated or otherwise changed frequently (e.g., in response to a scene change, object deformation, etc.).

As noted above, the first approach of generating world-space bounding boxes (e.g., at TLAS leaf nodes) by individually transforming each vertex included in a scene object from object-space to world-space can offer the greatest ray tracing performance, but with higher up-front computational cost of BVH construction. For example, a maximally tight world-space bounding box such as AABB 850 of FIG. 8B can be associated with the quickest completion time or lowest amount of required time to perform ray tracing and/or ray intersection tests, as compared to looser or non-maximally tight world-space bounding boxes (e.g., such as the relatively loose world-space bounding box 830 of FIG. 8A). A maximally tight world-space bounding box such as AABB 850 may also be associated with the greatest completion time for BVH construction or computation, since each individual vertex is transformed from object-space to world-space before the maximally tight world-space bounding box 850 can be constructed. Therefore, this first approach of generating world-space bounding boxes by individually transforming each vertex of a scene object from object-space to world-space may be used when a relatively large time budget is available for BVH construction and a relatively small time budget is available for ray tracing operations such as ray intersection tests. Additionally or alternatively, in some cases the first approach may be performed when adequate computational resources are available for performing such techniques. In some aspects, the ray tracing system 600 can dynamically determine which approach to take based on available time budget and/or available computations resources.

In another illustrative example, the ray tracing system 600 can perform a second approach to determine a world-space bounding box (e.g., a world-space AABB) that is tight to an underlying scene object. The second approach includes determining a proxy geometry for one or more vertices associated with the scene object. After determining the proxy geometry (or an approximation thereof) for the scene object, the ray tracing system 600 can calculate or otherwise determine a world-space bounding box or AABB over the vertices of the proxy geometry using the first approach described above. For example, the systems and techniques described herein can transform each vertex of the proxy geometry from object-space to world-space and then calculate the world-space AABB over the transformed vertices.

An example of this second approach of determining a tight world-space bounding box based on a proxy geometry determined for a scene object is illustrated in FIG. 8C. As illustrated, FIG. 8C is a diagram 800c depicting an example of an Object-To-World transformation of a scene object 710 and its associated proxy geometry 740 (or an approximation thereof). In some examples, proxy geometry 740 is computed or otherwise determined for object-space vertices included in scene object 710. Subsequently, vertices of proxy geometry 740 can be transformed from an object-space representation into a world-space representation (e.g., using an Object-To-World matrix). The transformed world-space vertices of proxy geometry 740 can then be used to calculate or construct a tight world-space bounding box 870 (e.g., an AABB) that encloses both the proxy geometry 740 and all of the geometry of scene object 710. It is noted that, in comparison to the relatively loose world-space bounding box 830 of FIG. 8A, the proxy geometry-based world-space bounding box 870 is relatively tight to the same underlying scene object 710 and can therefore offer improved ray tracing performance and/or speed.

In some examples, scene object 710 can be the same as the scene object 710 described above with respect to one or more of FIGS. 7A-8B. In some cases, proxy geometry 740 can be the same as or similar to the proxy geometry 740 previously described with respect to FIG. 7B. For example, the proxy geometry can be a convex hull (or a convex hull approximation) determined over the set of all vertices included in the scene object 710. In some cases, other hull geometries and/or proxy geometries can be calculated or approximated over the vertices of scene object 710 without departing from the scope of the present disclosure.

In some aspects, the determination of proxy geometry 740 may introduce an additional computational overhead. However, the additional computational overhead of determining proxy geometry 740 can, in some examples, be less than the computational overhead of transforming each vertex of the scene object 710 from object-space to world-space. In some examples, the initial determination of proxy geometry 740 can reduce the total number of vertices of scene object 710 that are ultimately transformed from object-space to world-space, and as such, may result in a faster (e.g., shorter) BVH construction time than that associated with constructing the maximally tight world-space AABB 850 as described above with respect to FIG. 8B. In some cases, the world-space bounding box or AABB 870 that can be subsequently calculated over the resulting proxy geometry 740 can have a greater tightness relative to the underlying scene object 710 than the loose world-space bounding box 830 of FIG. 8A and a lesser computational cost relative to the maximally tight world-space bounding box 850 of FIG. 8B.

In another illustrative example, the ray tracing system 600 can perform a third approach to determining a world-space bounding box that is tight to an underlying scene object. The third approach includes applying a graph cut across an acceleration data structure associated with the primitives of the scene object. The ray tracing system 600 can transform vertices of acceleration data structure nodes (e.g., BVH and/or BLAS nodes) that are adjacent to or at the graph cut line (e.g., immediately above or below the graph cut line) from object-space to world-space. A world-space bounding box generated or constructed for the transformed vertices at the graph cut line can be tight to the underlying scene object stored in the acceleration data structure to which the graph cut was applied.

In some examples, the ray tracing system 600 can use the third approach of applying a graph cut to an acceleration data structure to apply a graph cut across the BLAS associated with a TLAS leaf node, obtain the object-space bounding boxes (e.g., AABBs) for the BLAS nodes immediately above or below the graph cut line, and transform the vertices of the object-space AABBs into a set of world-space vertices. The ray tracing system 600 can then construct a world-space AABB around the resulting set of transformed vertices and use the world-space AABB as a tight world-space bounding box for the TLAS leaf node.

Figures 9A, 9B:
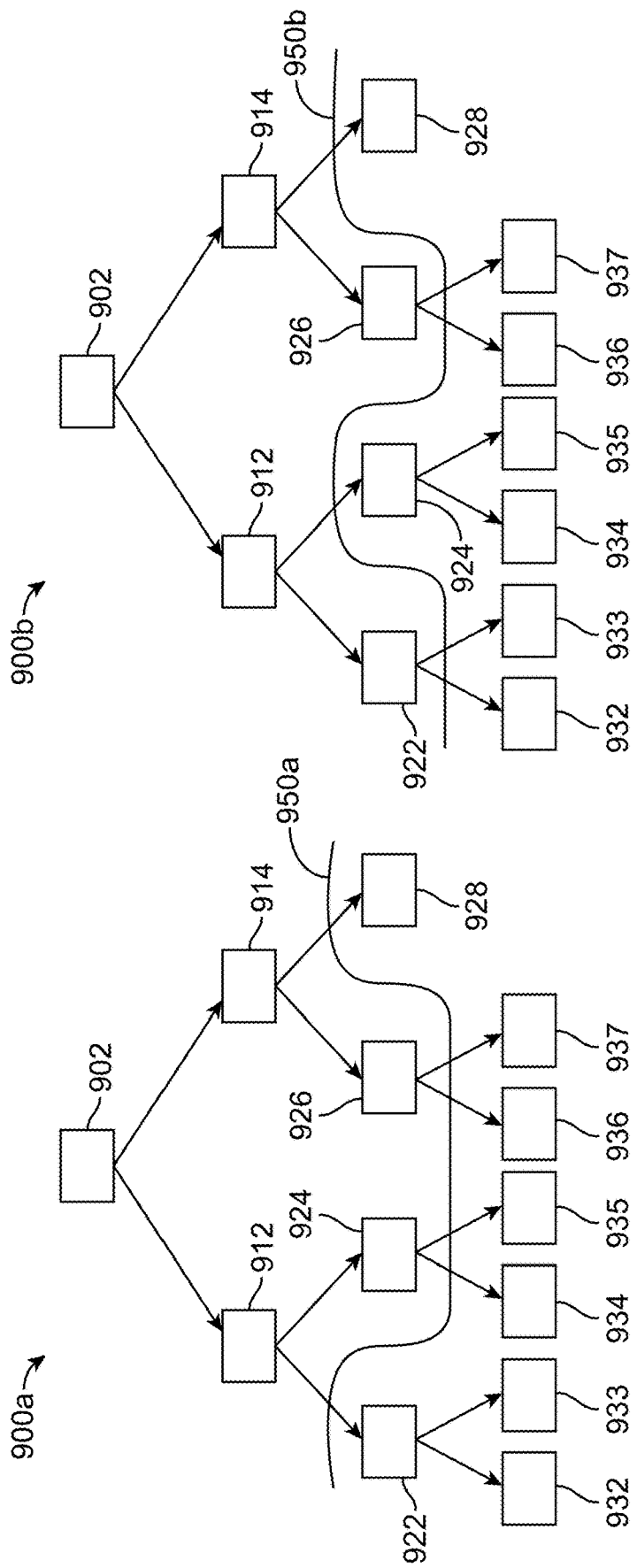
FIG. 9A illustrates an example of a graph cut applied across an acceleration data structure, in accordance with some examples of the present disclosure.
FIG. 9B illustrates another example of a graph cut applied across the acceleration data structure of FIG. 9A, in accordance with some examples of the present disclosure.

An example of this third approach is illustrated in FIGS. 9A and 9B, which depict two different graph cut lines 950a and 950b, respectively, applied to the same acceleration data structure. In the example of FIGS. 9A and 9B, the illustrated acceleration data structure (e.g., acceleration data structure 900a and acceleration data structure 900b, respectively) can be a BVH and/or a BLAS.

In some cases, when the acceleration data structure is a TLAS and/or a BLAS, a tight world-space bounding box can be obtained based on applying a graph cut 950a or 950b across the bottom level BVH (e.g., BLAS) included in a given TLAS leaf node. A graph cut partitions the nodes of the bottom level BVH into two disjoint subsets, such that any path from the root node 902 of the bottom level BVH to a leaf node (e.g., 932, 933, 934, 935, 936, 937, 928) of the bottom level BVH crosses the graph cut line (e.g., 950a, 950b) exactly once. Based on this observation, any graph cut across the bottom level BVH will yield a set of AABBs that contain the entire geometry of the scene object or model that is represented by the bottom level BVH or BLAS.

For example, with respect to FIG. 9A, the graph cut line 950a partitions the nodes of acceleration data structure 900a (e.g., BLAS or BVH) into two disjoint subsets, with a first subset located above graph cut line 950a and a second subset located below graph cut line 950b. The first subset of nodes includes a BLAS root node 902 and BLAS child nodes 912, 914, 924, and 926 (e.g., above graph cut line 950a). The second subset of nodes includes BLAS child node 922 and BLAS leaf nodes 928, 932, 933, 934, 935, 936, and 937 (e.g., below graph cut line 950a). The set of AABBs/bounding boxes of the nodes that are immediately adjacent to (e.g., either directly above or directly below) graph cut line 950a contain the entire geometry of the underlying scene object that is represented by acceleration data structure 900a.

With respect to FIG. 9B, the graph cut line 950b partitions the nodes of acceleration data structure 900b (e.g., BLAS or BVH) into two disjoint subsets, with a first subset located above graph cut line 950b and a second subset located below graph cut line 950b. Because graph cut line 950b is different from graph cut line 950a, so too are the disjoint subsets associated with each graph cut line also different from each other. For example, the first subset of nodes created by graph cut line 950b includes BLAS root node 902 and BLAS child nodes 912, 914, 922, and 926 (e.g., above graph cut line 950b). The second subset of nodes created by graph cut line 950b includes BLAS child node 924 and BLAS leaf nodes 928, 932, 933, 934, 935, 936, and 937.

In some cases, the ray tracing system 600 can determine optimal graph cut by applying a cost metric during the traversal or examination of the acceleration data structure(s) associated with the primitives of the scene object. For example, the acceleration data structures can include an acceleration data structure 900a, 900b (e.g., as described above) and/or a bottom-level BVH. In some aspects, the ray tracing system 600 can determine an optimal graph cut by applying a Surface Area Heuristic (SAH) to treelet growth for a given computational budget. The SAH provides an estimate of the ray tracing performance of different build decisions for a BVH or other acceleration data structure. In some cases, the ray tracing system 600 can use the SAH to determine the choice of graph cut across a BLAS through an iterative technique in which a root node (e.g., the root node 902 of the acceleration data structure 900a, 900b or the root node of a bottom level BVH otherwise associated with a TLAS leaf node) is placed in a stack and has its child nodes (e.g., nodes 912-926) selectively expanded based on their SAH until the number of nodes in the stack reaches a pre-determined computational budget.

Figure 9C:
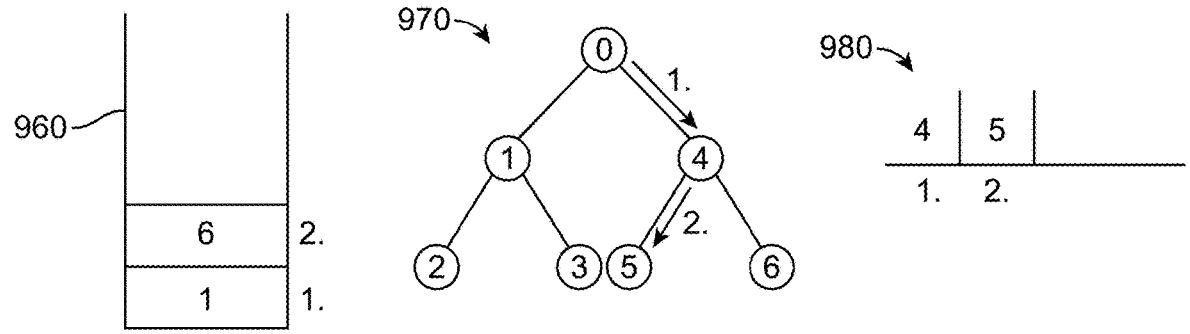
FIG. 9C illustrates an example of a traversal technique for determining a graph cut to apply across an acceleration data structure, in accordance with some examples of the present disclosure.
Figure 9D:
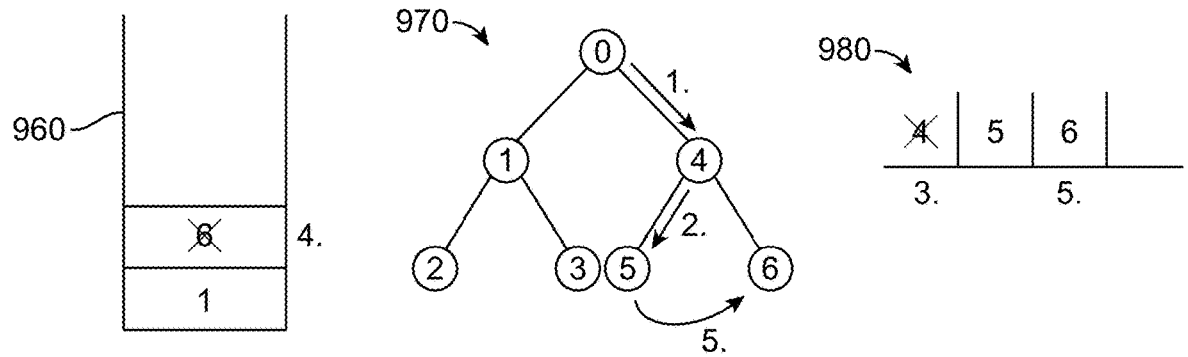
FIG. 9D illustrates another example of a traversal technique for determining a graph cut to apply across an acceleration data structure, in accordance with some examples of the present disclosure.
Figure 9E:
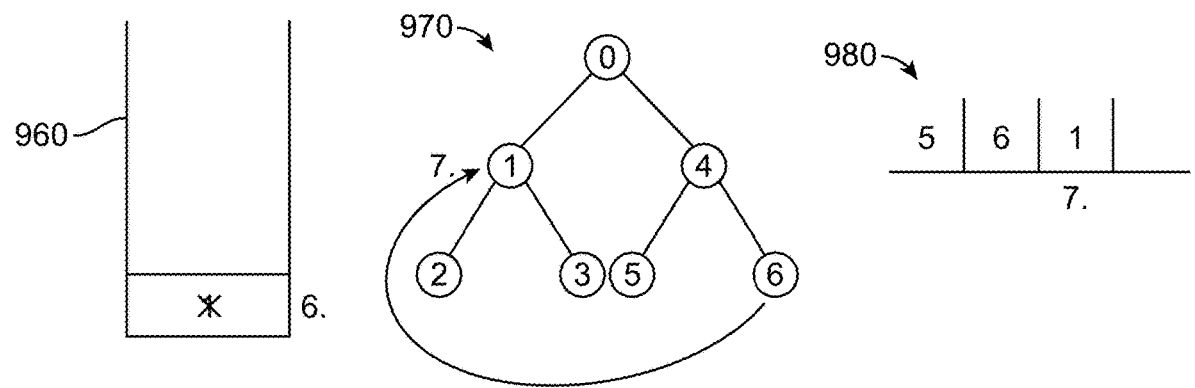
FIG. 9E illustrates another example of a traversal technique for determining a graph cut to apply across an acceleration data structure, in accordance with some examples of the present disclosure.

FIGS. 9C-9E depict an illustrative example of a technique that can be performed by the ray tracing system 600 for determining a set of nodes 980 that can be used to determine an optimal graph cut across an acceleration data structure 970 (e.g., as described above). In some cases, the acceleration data structure 970 can be a BVH or other hierarchical tree-based structure. As illustrated, a stack 960 can store one or more nodes of the acceleration data structure 970. In one illustrative example, the stack 960 can be part of the memory 616 of FIG. 6. As will be explained in greater depth below, traversal of the acceleration data structure 970 to determine the optimal graph cut can be based at least in part on popping the stack 960 (e.g., taking the top node or element from stack 960). In some examples, when the traversal of acceleration data structure 970 reaches a leaf node of the acceleration data structure 970, the stack 960 can be popped and traversal can proceed to the top node that was popped from stack 960.

In some aspects, after the root node of the acceleration data structure 970 (e.g., root node 902 of FIG. 9A and FIG. 9B) has been traversed or placed in the stack 960, the iterative technique for determining an optimal graph cut across acceleration data structure 970 can be performed as follows: 1) pop the stack (e.g., take the top node or element from the stack) and place the popped node's or element's children on the stack; 2) sort the stack by the SAH of each element; and 3) repeat until the number of nodes on the stack reaches the computational budget.

For example, as illustrated in FIG. 9C, traversal can begin at the root node (e.g., node 0) of the acceleration data structure 970. Node 1 and node 4 are the two children of root node 0, and traversal will proceed from root node 0 to either node 1 or node 4. In some embodiments, the selection between the two available child nodes can be based on the SAH as applied to node 1 and node 4. For example, traversal can proceed from root node 0 to the child node with the lowest SAH value.

As depicted in FIG. 9C, traversal proceeds from root node 0 to node 4 (e.g., in some examples, node 4 is determined to have a lower SAH value than node 1). Node 1, as the non-selected or non-visited child node, is pushed to the stack 960. In some cases, node 1 can be pushed to stack 960 based at least in part on a determination that the traversal of acceleration data structure 970 should visit node 1 at some point in the future. Stack 960 can be used as a queue or indication of nodes that were not selected for traversal but should be visited or traversed in the future.

After the traversal proceeds from root node 0 to child node 4 (e.g., after the child node 4 is visited), node 4 can be added to a current set or listing (e.g., to the set of nodes 980) that includes nodes of acceleration data structure 970 that may be used to determine the optimal graph cut.

After the traversal has visited or otherwise examined node 4, the traversal can proceed to one of the children of node 4. As illustrated in FIG. 9C, the children of node 4 are leaf node 5 and leaf node 6. Similar to as was described above, one of the two leaf nodes can be selected for traversal in a next step (e.g., based on the SAH), with the non-selected leaf node being pushed to stack 960.

In the example of FIG. 9C, leaf node 5 is selected for traversal and leaf node 6 is non-selected (e.g., and leaf node 6 is therefore pushed to stack 960 for traversal in a future step). Traversal proceeds from child node 4 to leaf node 5, and leaf node 5 is added to the set of nodes 980 of acceleration data structure 970 that may be used to determine the optimal graph cut. As illustrated in FIG. 9C, the set of nodes 980 currently contains node 4 and node 5.

As illustrated in FIG. 9D, node 4 can be removed from the set of nodes 980, based on the addition of its child node 5 to same set of nodes 980. For example, because acceleration data structure 970 is a BVH or other hierarchical tree structure, the set of nodes 980 can be maintained to avoid the simultaneous presence of a parent node and its child node.

After the traversal has visited or otherwise completed an examination of node 5, node 5 can be checked for any child nodes that can be visited in a next traversal step. However, because node 5 is a leaf node of the acceleration data structure 970, no child nodes are available to visit in the next traversal step. In response to no nodes being available to visit in the next traversal step, the node stored at the top of stack 960 can be popped and visited in the next traversal step.

As illustrated in FIG. 9D, node 6 is the node stored at the top of stack 960. Traversal can therefore proceed from leaf node 5 to leaf node 6. Popping leaf node 6 from stack 960 can cause the leaf node 6 to be removed from stack 960 (e.g., leaving node 1 as the new topmost node stored at the top of stack 960). Leaf node 6 can then be added to the set of nodes 980 that may be used to determine an optimal graph cut across the acceleration data structure 970. At the end of the traversal step that visits or otherwise examines leaf node 6, the set of nodes 980 contains leaf node 5 and leaf node 6, and the stack 960 contains the child node 1.

After the traversal has visited or otherwise completed an examination of node 6 (e.g., after node 6 has been added to the set of nodes 980), node 6 can be checked for any child nodes that can be visited in a next traversal step. Node 6 is a leaf node of the acceleration data structure 970, and therefore has no child nodes that can be visited in the next traversal step. As described above, in response to determining that node 6 has no child nodes that can be visited in the next traversal step, the node stored at the top of stack 960 can be popped and visited in the next traversal step.

As illustrated in FIG. 9E, node 1 is the node stored at the top of stack 960. Traversal can therefore proceed from node 6 to node 1, as is also illustrated in FIG. 9E. In response to being popped from the stack 960, node 1 can be removed from the stack 960. Node 1 can then be added to the set of nodes 980 that may be used to determine an optimal graph cut across the acceleration data structure 970. After the traversal step visits or otherwise examines node 1, the stack 960 is empty and the set of nodes 980 contains three nodes (e.g., node 5, node 6, and node 7).

Although the most recently visited or traversed node (e.g., node 1) has two child nodes (e.g., node 2 and node 3), the iterative traversal technique described above can terminate without visiting nodes 2 or 3. In one illustrative example, the iterative traversal technique can terminate based on a pre-determined computational budget being reached. For example, the pre-determined computational budget can include a maximum number of nodes or entries that can be stored in then set of nodes 980 (e.g., if the pre-determined computational budget indicates that the maximum number of nodes that can be stored in the set of nodes 980 is three, the iterative traversal technique can terminate after the example of FIG. 9E).

At the end of the iterative technique (e.g., once the pre-determined computational budget is reached), the set of nodes 980 or elements can represent an optimal graph cut across the acceleration data structure 970 for the given computational budget. The ray tracing system 600 can then calculate a world-space AABB for the vertices of the BLAS nodes adjacent to the determined optimal graph cut line, as has been described above. For example, the world-space AABB can be calculated by applying an Object-To-World matrix to the vertices of the object-space AABBs of the BLAS nodes adjacent to the graph cut line and then building the world-space AABB over the transformed vertices.

In some aspects, the selection of a graph cut line to apply across the BLAS (e.g., bottom level BVH) of a TLAS leaf node can be used to obtain a desired degree of granularity or tightness in the world-space bounding box that is subsequently constructed for the TLAS leaf node. For example, a graph cut applied immediately below the BLAS root node of a TLAS leaf node would result in a world-space AABB with a relatively low degree of tightness (e.g., because the world-space AABB generated for the TLAS leaf node is built around the vertices of the BLAS root node's AABB).

In some examples, a graph cut applied immediately above the BLAS leaf nodes would result in a world-space AABB with a relatively high degree of tightness (e.g., because the BLAS leaf nodes contain the individual primitives of the BLAS, the world-space AABB generated for the TLAS leaf node is built around the vertices of each individual primitive). In some cases, applying a graph cut immediately above the BLAS leaf nodes can result in the same world-space AABB as is generated according to the first approach described above (e.g., because both approaches transform each vertex of the individual primitives into world-space vertices that are then used to generate a maximally tight world-space AABB).

In some cases, graph cut selection can therefore offer a tunable selection in the tradeoff between world-space AABB versus compute time. A larger amount of compute time is needed to build a BVH with tight AABBs than loose AABBs; however, tighter AABBs allow subsequent ray tracing to be performed in less compute time. In an illustrative example, graph cut selection can be performed based at least in part on one or more cost metrics indicating the amount of available compute time for BVH and/or AABB building and the amount of available compute time for ray tracing. Graph cut selection can additionally be based on a prediction or understanding of how often the bottom level BVH and world-space AABBs might be rebuilt for a given scene object, as a fast BVH and AABB build time may be needed for scene objects that deform or otherwise require frequent BVH rebuilds. In some examples, a particular approach can be selected or configured as described above based on a known or determined BVH build time metric, e.g., such that an appropriate BVH and/or a tightest world-space AABBs can be constructed subject to the constraint of maximum build time given by the BVH build time metric.

Figure 10:
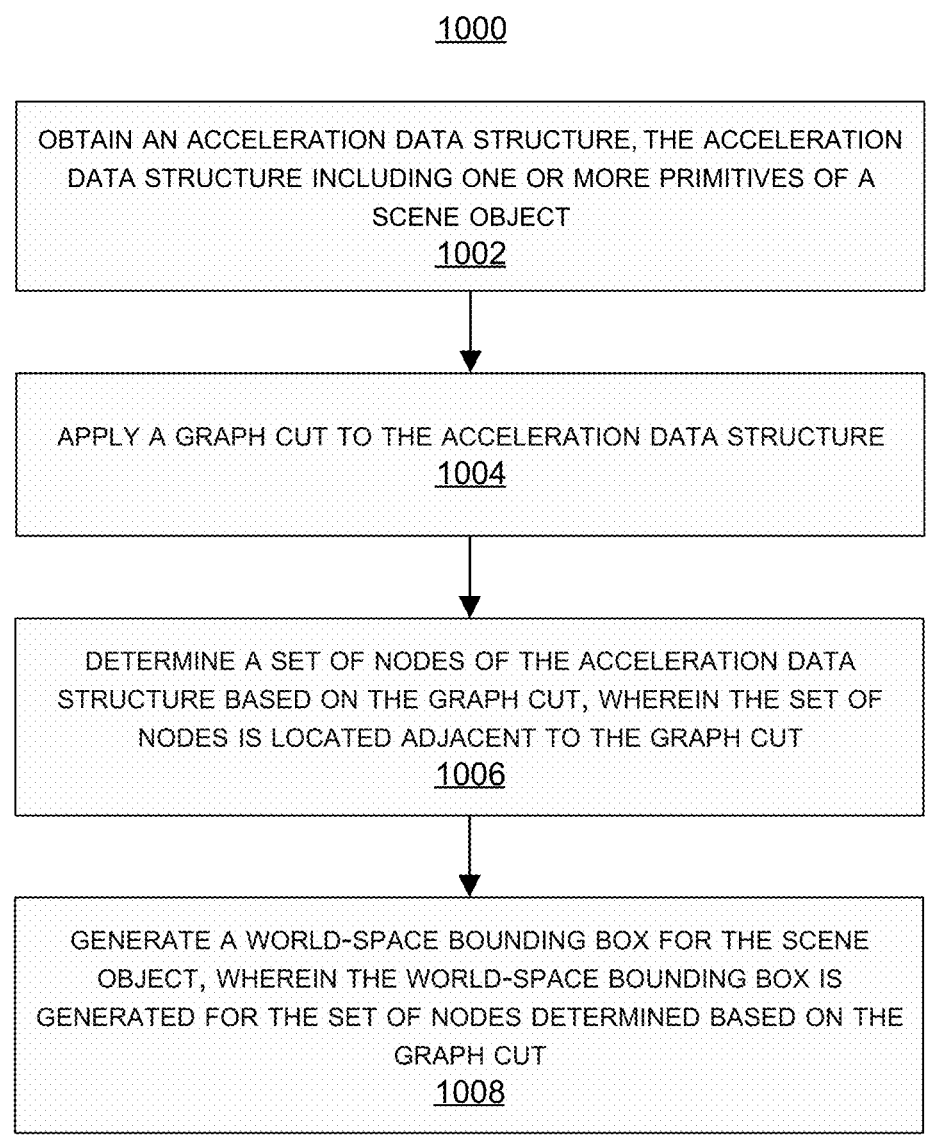
FIG. 10 is a flow diagram illustrating an example of a process for graphics processing, in accordance with some examples of the present disclosure.

FIG. 10 is a flowchart illustrating an example of a process 1000 for graphics processing. Although the example process 1000 depicts a particular sequence of operations, the sequence may be altered without departing from the scope of the present disclosure. For example, some of the operations depicted may be performed in parallel or in a different sequence that does not materially affect the function of the process 1000. In other examples, different components of an example device or system that implements the process 1000 may perform functions at substantially the same time or in a specific sequence.

At block 1002, the process 1000 includes obtaining an acceleration data structure. In some examples, the acceleration data structure includes one or more primitives of a scene object. For example, the acceleration data structure can be obtained by or from the acceleration data structure engine 622 associated with the ray tracing system 600 illustrated in FIG. 6. In some cases, the acceleration data structure can include a bounding volume hierarchy (BVH). In some examples, the acceleration data structure can include a bottom-level acceleration structure (BLAS). For example, the acceleration data structure can include one or more of the acceleration data structure 900a illustrated in FIG. 9A and/or the acceleration data structure 900b illustrated in FIG. 9B. In some cases, the one or more primitives of the scene object can be included in one or more leaf nodes of the acceleration data structure. For example, one or more of the leaf nodes 928 and 932-937 of the acceleration data structure 900a illustrated in FIG. 9A and/or of the acceleration data structure 900b illustrated in FIG. 9B can include the one or more primitives of the scene object.

In some examples, the acceleration data structure can include a BLAS that is associated with a top-level acceleration structure (TLAS) leaf node. In examples where the acceleration data structure includes a BLAS, the BLAS can additionally, or alternatively, include one or more intermediate BLAS nodes. For example, the one or more intermediate BLAS nodes can include one or more of the BLAS child nodes 912, 922, 924 and/or 926 of the acceleration data structure 900a illustrated in FIG. 9A and/or of the acceleration data structure 900b illustrated in FIG. 9B. One or more of the intermediate BLAS nodes can include an axis-aligned bounding box (AABB) encompassing a subset of the one or more primitives of the scene object.

At block 1004, the process 1000 includes applying a graph cut to the acceleration data structure. In some examples, the graph cut can be applied directly above or directly below a plurality of leaf nodes of the acceleration data structure. In some cases, when the acceleration data structure is a TLAS and/or a BLAS, the graph cut can be applied across the bottom level BVH (e.g., BLAS) included in a given TLAS leaf node. Applying the graph cut can partition the nodes of the acceleration data structure into two disjoint subsets, such that any path from the root node of the acceleration data structure to a leaf node of the acceleration data structure crosses the graph cut line exactly once. For example, applying the graph cut to the acceleration data structure can include applying the graph cut line 950a illustrated in FIG. 9A or the graph cut line 950b illustrated in FIG. 9B. In some cases, any graph cut across a bottom level BVH or acceleration data structure can be used to determine a set of bounding boxes (e.g., AABBs) that contain the entire geometry (e.g., the primitives included in the acceleration data structure) of the scene object associated with the acceleration data structure.

At block 1006, the process 1000 includes determining a set of nodes of the acceleration data structure based on the graph cut. In some examples, the set of nodes is located adjacent to the graph cut. For example, the set of nodes determined based on the graph cut can include the one or more nodes of the acceleration data structure that are located immediately above the graph cut line. In some cases, the set of nodes determined based on the graph cut can include the one or more nodes of the acceleration data structure that are located immediately below the graph cut line.

In some examples, the set of nodes determined based on the graph cut can include a plurality of leaf nodes of the acceleration data structure. The plurality of leaf nodes can include each vertex of the scene object associated with the acceleration data structure. For example, the set of nodes determined based on the graph cut can include the nodes 922, 924, 925, 936, 937, and 928 illustrated in FIG. 9A as being located immediately below the graph cut line 950a. In another example, the set of nodes determined based on the graph cut can include the nodes 932, 933, 924, 936, 937, and 928 illustrated in FIG. 9B as being located immediately below the graph cut line 950b.

In some examples, at block 1006, the process 1000 can further include determining one or more child nodes of a root node of the acceleration data structure and determining a Surface Area Heuristic (SAH) for each child node. The graph cut can be applied to the acceleration data structure based on the determined SAH for each child node. For example, the one or more child nodes can be determined based on the graph cut and/or graph cut line (e.g., as described above). In some cases, an optimal graph cut for a given computational cost budget can be determined using the SAH. For example, the SAH can be applied to treelet growth of the acceleration data structure for the given computational cost budget. In some cases, an iterative technique can be used to determine the optimal graph cut to apply to the acceleration data structure. For example, the iterative technique can include placing the root node of the acceleration data structure in a stack and selectively expanding the root node and its child nodes (e.g., by popping the stack) based on their SAH until the number of nodes in the stack reaches the given computational budget. In some examples, the root node of the acceleration data structure can be placed in the stack 960 illustrated in FIGS. 9C-9E. The stack (e.g., stack 960) can be included in the memory 616 illustrated in the ray tracing system 600 of FIG. 6.

At block 1008, the process 1000 includes generating a world-space bounding box for the scene object (e.g., the scene object associated with the acceleration data structure). In some examples, the world-space bounding box is generated for the set of nodes determined based on the graph cut. For example, the generated world-space bounding box can include one or more of the world-space bounding boxes 830, 850, and/or 870 illustrated in FIGS. 8A-8C, respectively. In some cases, the world-space bounding box generated for the scene object can be a world-space axis-aligned bounding box (AABB).

In some examples, at block 1008, the process 1000 can include obtaining a respective object-space bounding box for each node of the set of nodes determined based on the graph cut. Each respective object-space bounding box of each node (e.g., each node of the set of nodes determined based on the graph cut) can be transformed into a plurality of world-space vertices. In some examples, the world-space bounding box for the scene object can be generated using the transformed plurality of world-space vertices.

In some examples, the processes described herein (e.g., process 1000 and/or any other process described herein) may be performed by a computing device, apparatus, or system. In one example, the process 1000 can be performed by a computing device or system having the computing device architecture 1100 of FIG. 11. The computing device, apparatus, or system can include any suitable device, such as a mobile device (e.g., a mobile phone), a desktop computing device, a tablet computing device, a wearable device (e.g., a VR headset, an AR headset, AR glasses, an extended reality (XR) device (e.g., a VR headset or HMD, an AR headset, HMD, or glasses, etc.), a network-connected watch or smartwatch, or other wearable device), a server computer, a vehicle (e.g., autonomous or non-autonomous vehicle) or computing device of a vehicle, a robotic device, a laptop computer, a smart television, a camera, and/or any other computing device with the resource capabilities to perform the processes described herein, including the process 1000 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
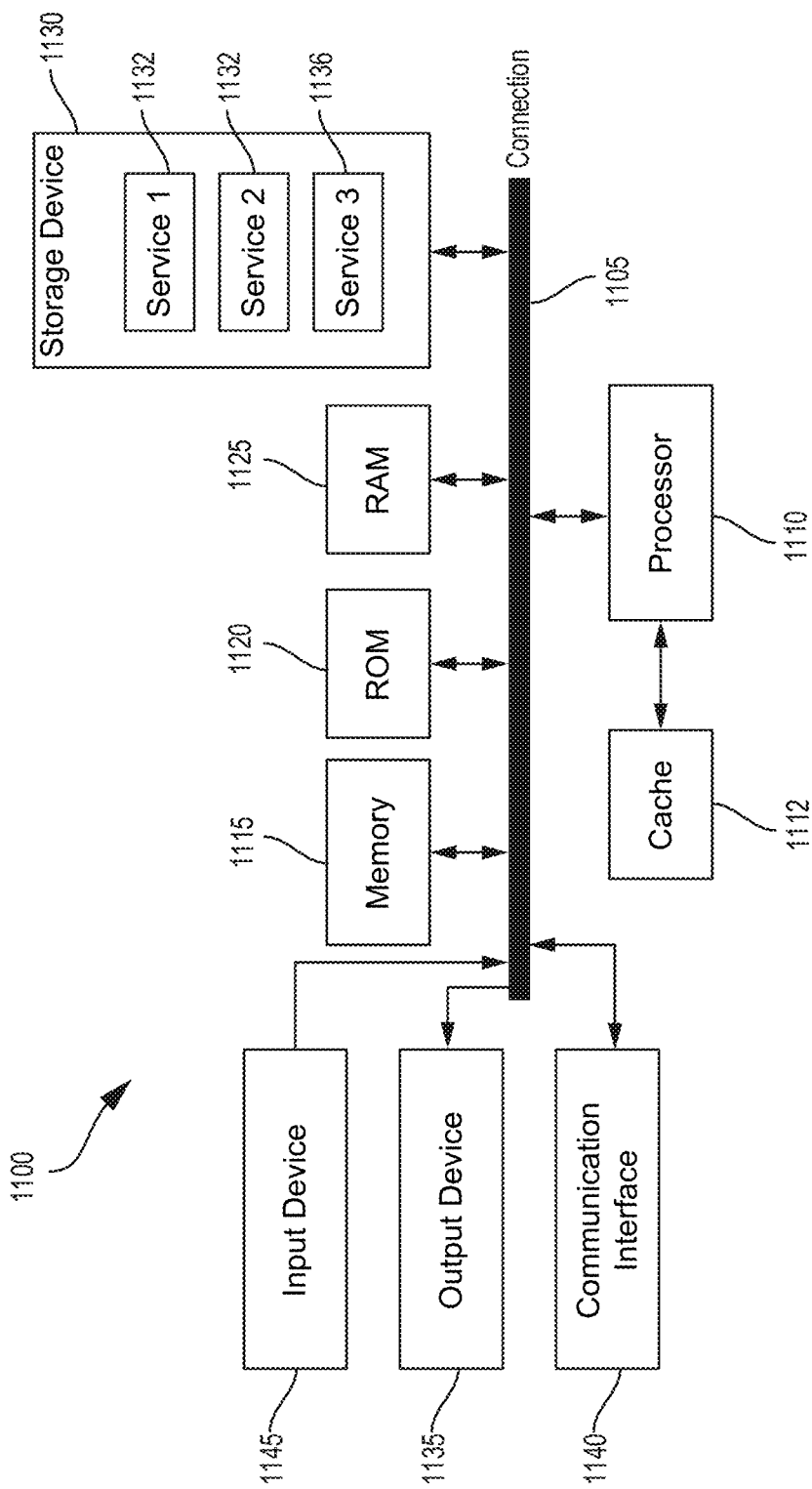
FIG. 11 is a block diagram illustrating an example of a computing system for implementing certain aspects described herein.

FIG. 11 illustrates an example computing device architecture 1100 of an example computing device which can implement the various techniques described herein. In some examples, the computing device can include a mobile device, a wearable device, an extended reality device (e.g., a virtual reality (VR) device, an augmented reality (AR) device, an extended reality (XR) device, or a mixed reality (MR) device), a personal computer, a laptop computer, a video server, a vehicle (or computing device of a vehicle), or other device. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random-access memory (RAM) 1125, to processor 1110.

Computing device architecture 1100 can include a cache of high-speed memory connected directly with, in close proximity to, or integrated as part of processor 1110 Computing device architecture 1100 can copy data from memory 1115 and/or the storage device 1130 to cache 1112 for quick access by processor 1110. In this way, the cache can provide a performance boost that avoids processor 1110 delays while waiting for data. These and other engines can control or be configured to control processor 1110 to perform various actions. Other computing device memory 1115 may be available for use as well. Memory 1115 can include multiple different types of memory with different performance characteristics. Processor 1110 can include any general-purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules or engines are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of ray tracing, the method comprising: obtaining an acceleration data structure, the acceleration data structure including one or more primitives of a scene object; applying a graph cut to the acceleration data structure; determining a set of nodes of the acceleration data structure based on the graph cut, wherein the set of nodes is located adjacent to the graph cut; and generating a world-space bounding box for the scene object, wherein the world-space bounding box is generated for the set of nodes determined based on the graph cut.

Aspect 2: The method of Aspect 1, further comprising: obtaining a respective object-space bounding box for each node of the set of nodes; and transforming each respective object-space bounding box of each node into a plurality of world-space vertices.

Aspect 3: The method of Aspect 2, wherein the world-space bounding box for the scene object is generated based on the plurality of world-space vertices.

Aspect 4: The method of any of Aspects 1 to 3, further comprising: determining one or more child nodes of a root node of the acceleration data structure; determining a Surface Area Heuristic (SAH) for each child node of the one or more child nodes; and applying the graph cut to the acceleration data structure based on the determined SAH for each child node.

Aspect 5: The method of Aspect 4, further comprising: determining a computational cost budget specifying a maximum number of nodes in the set of nodes based on the graph cut; and determining the SAH for each child node of the one or more child nodes based on the determined computational cost.

Aspect 6: The method of any of Aspects 1 to 5, wherein the graph cut is applied directly above or directly below a plurality of leaf nodes of the acceleration data structure.

Aspect 7: The method of any of Aspects 1 to 6, wherein: the set of nodes determined based on the graph cut includes a plurality of leaf nodes of the acceleration data structure, wherein the plurality of leaf nodes includes each vertex of the scene object.

Aspect 8: The method of Aspect 7, wherein the world-space bounding box is generated based at least in part on transforming each vertex of the scene object from an object-space representation into a world-space representation.

Aspect 9: The method of any of Aspects 1 to 8, wherein the one or more primitives of the scene object are included in one or more leaf nodes of the acceleration data structure.

Aspect 10: The method of any of Aspects 1 to 9, wherein the world-space bounding box generated for the scene object is a world-space axis-aligned bounding box (AABB).

Aspect 11: The method of any of Aspects 1 to 10, wherein the acceleration data structure includes a bounding volume hierarchy (BVH).

Aspect 12: The method of any of Aspects 1 to 11, wherein the acceleration data structure includes a bottom-level acceleration structure (BLAS).

Aspect 13: The method of Aspect 12, wherein the BLAS: is associated with a top-level acceleration structure (TLAS) leaf node; and includes one or more intermediate BLAS nodes, each intermediate BLAS node including an axis-aligned bounding box (AABB) encompassing a subset of the one or more primitives of the scene object.

Aspect 14: The method of any of Aspects 1 to 13, wherein the set of nodes located adjacent to the graph cut is located above the graph cut or below the graph cut.

Aspect 15: A method of ray tracing, the method comprising: obtaining a bottom-level acceleration structure (BLAS), the BLAS including one or more primitives of a scene object; calculating a proxy geometry for a plurality of vertices of the BLAS, the proxy geometry having a first number of vertices that is smaller than a number of vertices contained in the BLAS; transforming the first number of vertices of the proxy geometry into a plurality of proxy geometry world-space vertices; and generating a world-space axis-aligned bounding box (AABB) for the BLAS, wherein the world-space axis-aligned bounding box encloses the plurality of proxy geometry world-space vertices.

Aspect 16: The method of Aspect 15, wherein the proxy geometry is a convex hull or an approximation of a convex hull.

Aspect 17: A method of ray tracing, the method comprising: obtaining a bottom-level acceleration structure (BLAS), the BLAS including a plurality of object-space vertices for one or more primitives of a scene object; transforming each vertex of the plurality of object-space vertices into a transformed world-space vertex; and generating a world-space axis-aligned bounding box (AABB) for the BLAS such that the world-space AABB encloses each transformed world-space vertex.

Aspect 18: An apparatus for ray tracing, comprising: a memory; and one or more processors coupled to the memory, the one or more processors configured to: obtain an acceleration data structure, the acceleration data structure including one or more primitives of a scene object, apply a graph cut to the acceleration data structure, determine a set of nodes of the acceleration data structure based on the graph cut, wherein the set of nodes is located adjacent to the graph cut, and generate a world-space bounding box for the scene object, wherein the world-space bounding box is generated for the set of nodes determined based on the graph cut.

Aspect 19: The apparatus of Aspect 18, wherein the one or more processors are configured to: obtain a respective object-space bounding box for each node of the set of nodes; and transform each respective object-space bounding box of each node into a plurality of world-space vertices.

Aspect 20: The apparatus of Aspect 19, wherein the world-space bounding box for the scene object is generated based on the plurality of world-space vertices.

Aspect 21: The apparatus of any of Aspects 18 to 20, wherein the one or more processors are configured to: determine one or more child nodes of a root node of the acceleration data structure; determine a Surface Area Heuristic (SAH) for each child node of the one or more child nodes; and apply the graph cut to the acceleration data structure based on the determined SAH for each child node.

Aspect 22: The apparatus of Aspect 21, wherein the one or more processors are configured to: determine a computational cost budget specifying a maximum number of nodes in the set of nodes based on the graph cut; and determine the SAH for each child node of the one or more child nodes based on the determined computational cost.

Aspect 23: The apparatus of any of Aspects 18 to 22, wherein the graph cut is applied directly above or directly below a plurality of leaf nodes of the acceleration data structure.

Aspect 24: The apparatus of any of Aspects 18 to 23, wherein the set of nodes determined based on the graph cut includes a plurality of leaf nodes of the acceleration data structure, wherein the plurality of leaf nodes includes each vertex of the scene object.

Aspect 25: The apparatus of Aspect 24, wherein the world-space bounding box is generated based at least in part on transforming each vertex of the scene object from an object-space representation into a world-space representation.

Aspect 26: The apparatus of any of Aspects 18 to 25, wherein the one or more primitives of the scene object are included in one or more leaf nodes of the acceleration data structure.

Aspect 27: The apparatus of any of Aspects 18 to 26, wherein the world-space bounding box generated for the scene object is a world-space axis-aligned bounding box (AABB).

Aspect 28: The apparatus of any of Aspects 18 to 27, wherein the acceleration data structure includes a bounding volume hierarchy (BVH).

Aspect 29: The apparatus of any of Aspects 18 to 28, wherein the acceleration data structure includes a bottom-level acceleration structure (BLAS).

Aspect 30: The apparatus of Aspect 29, wherein the BLAS: is associated with a top-level acceleration structure (TLAS) leaf node; and includes one or more intermediate BLAS nodes, each intermediate BLAS node including an axis-aligned bounding box (AABB) encompass a subset of the one or more primitives of the scene object.

Aspect 31: The apparatus of any of Aspects 18 to 30, wherein the set of nodes located adjacent to the graph cut is located above the graph cut or below the graph cut.

Aspect 32: An apparatus for ray tracing, comprising: a memory; and one or more processors coupled to the memory, the one or more processors configured to: obtain a bottom-level acceleration structure (BLAS), the BLAS including one or more primitives of a scene object; calculate a proxy geometry for a plurality of vertices of the BLAS, the proxy geometry having a first number of vertices that is smaller than a number of vertices contained in the BLAS; transform the first number of vertices of the proxy geometry into a plurality of proxy geometry world-space vertices; and generate a world-space axis-aligned bounding box (AABB) for the BLAS, wherein the world-space axis-aligned bounding box encloses the plurality of proxy geometry world-space vertices.

Aspect 33: The apparatus of Aspect 32, wherein the proxy geometry is a convex hull or an approximation of a convex hull.

Aspect 34: An apparatus for ray tracing, comprising: a memory; and one or more processors coupled to the memory, the one or more processors configured to: obtain a bottom-level acceleration structure (BLAS), the BLAS including a plurality of object-space vertices for one or more primitives of a scene object; transform each vertex of the plurality of object-space vertices into a transformed world-space vertex; and generate a world-space axis-aligned bounding box (AABB) for the BLAS such that the world-space AABB encloses each transformed world-space vertex.

Aspect 35: A non-transitory computer-readable storage medium having stored thereon instructions which, when executed by one or more processors, cause the one or more processors to perform any of the operations of Aspects 1 to 14 and Aspects 18 to 31.

Aspect 36: An apparatus comprising means for performing any of the operations of Aspects 1 to 14 and Aspects 18 to 31.

Aspect 37: A non-transitory computer-readable storage medium having stored thereon instructions which, when executed by one or more processors, cause the one or more processors to perform any of the operations of Aspects 15 to 16 and Aspects 32 to 33.

Aspect 38: An apparatus comprising means for performing any of the operations of Aspects 15 to 16 and Aspects 32 to 33.

Aspect 39: A non-transitory computer-readable storage medium having stored thereon instructions which, when executed by one or more processors, cause the one or more processors to perform any of the operations of Aspects 17 and 34.

Aspect 40: An apparatus comprising means for performing any of the operations of Aspects 17 and 34.

What is claimed is:

1. A method of ray tracing, the method comprising:
   obtaining an acceleration data structure corresponding to a plurality of nodes included in a bottom-level acceleration structure (BLAS) representative of a scene object, wherein the BLAS includes a plurality of object-space vertices associated with the scene object;
   calculating a convex hull proxy geometry comprising a convex hull of a BLAS root node included in the plurality of nodes, wherein the convex hull proxy geometry encloses the scene object using a calculated subset of object-space vertices included in the plurality of object-space vertices; and
   generating a world-space bounding box for the scene object, wherein the world-space bounding box is generated based on the set calculated subset of object-space vertices corresponding to the convex hull proxy geometry of the BLAS root node.

2. The method of claim 1, wherein the convex hull proxy geometry encloses the scene object based on the convex hull proxy geometry enclosing the plurality of object-space vertices associated with the scene object.

3. The method of claim 2, wherein the convex hull proxy geometry corresponds to the calculated subset of object-space vertices, and wherein the calculated subset of object-space vertices is different from the plurality of object-space vertices associated with the scene object.

4. The method of claim 2, wherein:
   the plurality of object-space vertices includes a first number of object-space vertices; and
   the calculated subset of object-space vertices includes a second number of object-space vertices, wherein the second number is less than the first number.

5. The method of claim 1, wherein generating the world-space bounding box for the scene object includes:
   transforming each vertex of the calculated subset of object-space vertices corresponding to the convex hull proxy geometry from an object-space representation into a world-space representation to generate a set of transformed world-space proxy geometry vertices.

6. The method of claim 5, wherein the world-space bounding box for the scene object is generated based on the set of transformed world-space proxy geometry vertices.

7. The method of claim 6, wherein the world-space bounding box for the scene object comprises a world-space axis-aligned bounding box (AABB) for the set of transformed world-space proxy geometry vertices.

8. The method of claim 1, wherein the world-space bounding box encloses a world-space representation of the convex hull proxy geometry and a world-space representation of the plurality of object-space vertices associated with the scene object.

9. The method of claim 1, wherein:
   the plurality of object-space vertices corresponding correspond to one or more primitives of the scene object; and
   each respective primitive of the one or more primitives is enclosed by the convex hull proxy geometry.

10. The method of claim 1, wherein the plurality of object-space vertices associated with the scene object comprise object-space vertices each corresponding to a respective corner of an object-space bounding box for the scene object.

11. The method of claim 10, wherein the object-space bounding box is an object-space axis-aligned bounding box (AABB).

12. The method of claim 1, wherein a number of vertices in the calculated subset of object-space vertices corresponding to the convex hull proxy geometry is less than a number of vertices in the plurality of object-space vertices associated with the scene object.

13. The method of claim 1, wherein the convex hull proxy geometry comprises an approximation of a convex hull of the plurality of object-space vertices associated with the scene object.

14. An apparatus for ray tracing, comprising:
   a memory; and
   one or more processors coupled to the memory, the one or more processors configured to:
      obtain an acceleration data structure corresponding to a plurality of nodes included in a bottom-level acceleration structure (BLAS) representative of a scene object, wherein the BLAS includes a plurality of object-space vertices associated with the scene object;
      calculate a convex hull proxy geometry comprising a convex hull of a BLAS root node included in the plurality of nodes, wherein the convex hull proxy geometry encloses the scene object using a calculated subset of object-space vertices included in the plurality of object-space vertices; and
      generate a world-space bounding box for the scene object, wherein the world-space bounding box is generated based on the calculated subset of object-space vertices corresponding to the convex hull proxy geometry of the BLAS root node.

15. The apparatus of claim 14, wherein the convex hull proxy geometry encloses the scene object based on the convex hull proxy geometry enclosing the plurality of object-space vertices associated with the scene object.

16. The apparatus of claim 15, wherein the convex hull proxy geometry corresponds to the calculated subset of object-space vertices, and wherein the calculated subset of object-space vertices is different from the plurality of object-space vertices associated with the scene object.

17. The apparatus of claim 15, wherein:
   the plurality of object-space vertices includes a first number of object-space vertices; and the calculated subset of object-space vertices includes a second number of object-space vertices, wherein the second number is less than the first number.

18. The apparatus of claim 14, wherein the convex hull proxy geometry comprises an approximation of a convex hull of the plurality of object-space vertices associated with the scene object.

19. The apparatus of claim 14, wherein, to generate the world-space bounding box for the scene object, the one or more processors are configured to:
   transform each vertex of the calculated subset of object-space vertices corresponding to the convex hull proxy geometry from an object-space representation into a world-space representation to generate a set of transformed world-space proxy geometry vertices.

20. The apparatus of claim 19, wherein the one or more processors are configured to generate the world-space bounding box for the scene object based on the set of transformed world-space proxy geometry vertices.

21. The apparatus of claim 20, wherein the world-space bounding box for the scene object comprises a world-space axis-aligned bounding box (AABB) for the set of transformed world-space proxy geometry vertices.

22. The apparatus of claim 14, wherein the world-space bounding box encloses a world-space representation of the convex hull proxy geometry and a world-space representation of the plurality of object-space vertices associated with the scene object.

23. The apparatus of claim 14, wherein:
   the plurality of object-space vertices corresponding correspond to one or more primitives of the scene object; and
   each respective primitive of the one or more primitives is enclosed by the convex hull proxy geometry.

24. The apparatus of claim 14, wherein the plurality of object-space vertices associated with the scene object comprise object-space vertices each corresponding to a respective corner of an object-space bounding box for the scene object.

25. The apparatus of claim 24, wherein the object-space bounding box is an object-space axis-aligned bounding box (AABB).

26. The apparatus of claim 14, wherein a number of vertices in the calculated subset of object-space vertices corresponding to the convex hull proxy geometry is less than a number of vertices in the plurality of object-space vertices associated with the scene object.

* * * * *